(12) United States Patent
Fukushima

(10) Patent No.: US 7,877,476 B2
(45) Date of Patent: Jan. 25, 2011

(54) COMMUNICATION MODEL, COUNTER SIGN SIGNAL, METHOD, AND DEVICE

(75) Inventor: Hajime Fukushima, 2-62-3, Nogatta, Nakano-ku, Tokyo (JP) 165-0027

(73) Assignee: Hajime Fukushima, Tokyo (JP)

( * ) Notice: Subject to any disclaimer, the term of this patent is extended or adjusted under 35 U.S.C. 154(b) by 1037 days.

(21) Appl. No.: 11/629,831

(22) PCT Filed: Jun. 27, 2005

(86) PCT No.: PCT/JP2005/011775
§ 371 (c)(1),
(2), (4) Date: Dec. 14, 2006

(87) PCT Pub. No.: WO2006/008918
PCT Pub. Date: Jan. 26, 2006

(65) Prior Publication Data
US 2007/0248112 A1 Oct. 25, 2007

(30) Foreign Application Priority Data

Jun. 25, 2004 (JP) .................. 2004-188846
Jun. 25, 2004 (JP) .................. 2004-188847
Jun. 29, 2004 (JP) .................. 2004-192349

(51) Int. Cl.
*G06F 15/173* (2006.01)
(52) U.S. Cl. ............... 709/224; 709/220; 709/238; 709/245
(58) Field of Classification Search ............ 709/227, 709/238, 245, 224, 220
See application file for complete search history.

(56) References Cited

U.S. PATENT DOCUMENTS

| | | | |
|---|---|---|---|
| 7,613,796 B2 * | 11/2009 | Harvey et al. | 709/220 |
| 2002/0031107 A1 * | 3/2002 | Li et al. | 370/338 |
| 2002/0040393 A1 * | 4/2002 | Christensen | 709/224 |
| 2002/0069278 A1 * | 6/2002 | Forslow | 709/225 |
| 2004/0264389 A1 * | 12/2004 | Abdo et al. | 709/245 |
| 2005/0169220 A1 * | 8/2005 | Sreemanthula et al. | 370/338 |

* cited by examiner

*Primary Examiner*—Philip B Tran
(74) *Attorney, Agent, or Firm*—Glenn Patent Group; Michael A. Glenn

(57) ABSTRACT

It is possible to detect communication partner state information between edge nodes without using a broker. Additional information is needed to achieve the aforementioned object.

6 Claims, 40 Drawing Sheets

| Static Identifier | Reply that should be made |

Fig. 13 (T side)

Screen 1

Countersign Setting Top

Countersign is not set.    [ Change ] ← Button

Additional Information is not set.    [ Change ]
                                   ↓
                            Go to Fig. 22.

Screen 2

Countersign Basic Setting

⦿ Setting Countersign   ← Input Field
[ abcdefg| ]

Radio Button →

\* Please input a static identifier you want to discover from other terminals in the input field. It will be "reply that should be made."
e.g. : host01.example.com ○ Not Setting Countersign

[ Reflect ]

Screen 1-2

Countersign Setting Top

Reply that should be made is set "abcdefg" at present.    [ Change ]

Additional information is not set at present.    [ Change ]
                           ↓
                 Go to Fig. 19, Screen 3

Fig. 18

Screen 3

Additional Information Setting

Setting Additional Information

○ Select Pattern

| Pull-down Menu |
| --- |
| Sleeping |
| Taking a Bath |
| Eating |
| Calling |
| Attended |
| Unattended |
| Gone Out |

○ Free String

| I'll be back soon. |
| --- |

\* Enter a message you want to send in the input box.

○ Program Output

| Pull-down Menu |
| --- |
| CPU Load Factor |
| Memory Utilization |
| I/F Traffic Condition |

○ Substitute External Program Output

| |
| --- |

\* Enter program name call.

◉ Plug-in  ( Read Plug-in )

○ Not Setting Additional Information ( Reflect )

Go to Fig. 20, Screen 3-2

Screen 4

Popup Window

| Select Plug-in |
| --- |
| Location Information by GPS Device |
| Location Information by GPS (PC) |
| Add Plug-in |

Fig. 19

Screen 3-2

Additional Information Setting

Setting Additional Information

○ Select Pattern

| Pull-down Menu |
| Sleeping |
| Taking a Bath |
| Eating |
| Calling |
| Attended |
| Unattended |
| Gone Out |

○

○ Free String

| I'll be back soon |

\* Enter a message you want to send in the input box.

○ Program Output

| Pull-down Menu |
| CPU Load Factor |
| Memory Utilization |
| I/F Traffic Condition |

○ Substitute External Program Output

\* Enter program name to call.

◉ Plug-in   ( Read Plug-in )

Plug-in "Location Information by GPS (PC)" is selected.

○ Not Setting Additional Information ( Reflect )

Screen 1-3

Countersign Setting Top

Reply that should be made is set "abcdefg" at present.   ( Change )

Additional Information is set to plug-in "Location Information by GPS (PC)" at present.   ( Change )

Fig. 20

Screen 3

Additional Information Setting

Setting Additional Information

○ Select Pattern

| Pull-down Menu |
| Sleeping |
| Taking a Bath |
| Eating |
| Calling |
| Attended |
| Unattended |
| Gone Out |

○ Free String

| I'll be back soon. |

\* Enter a message you want to send in the input box.

○ Program Output

| Pull-down Menu |
| CPU Load Factor |
| Memory Utilization |
| I/F Traffic Condition |

⦿ Plug-in    ( Read Plug-in )

○ Not Setting Additional Information ( Reflect )

Go to Fig. 20,
Screen 3-2

Screen 4

Popup Window

| Select Plug-in |
| Command Line Option |
| Location Information by GPS Device |
| Location Information by GPS (PC) |
| Add Plug-in |

Fig. 21

Host ○○○○ has reachability.

Present location of T as of 10:12 am is 3-4-3 Kasumigaseki, Chiyoda-ku, Tokyo.

OK

Host ○○○○ has reachability.

Track data of T and present location as of 2:12 pm.

OK a = Host for dial-up (assigned dynamically assigned network address)
b = Host for updating to mapping notification system
c = Host of which the reachability is checked

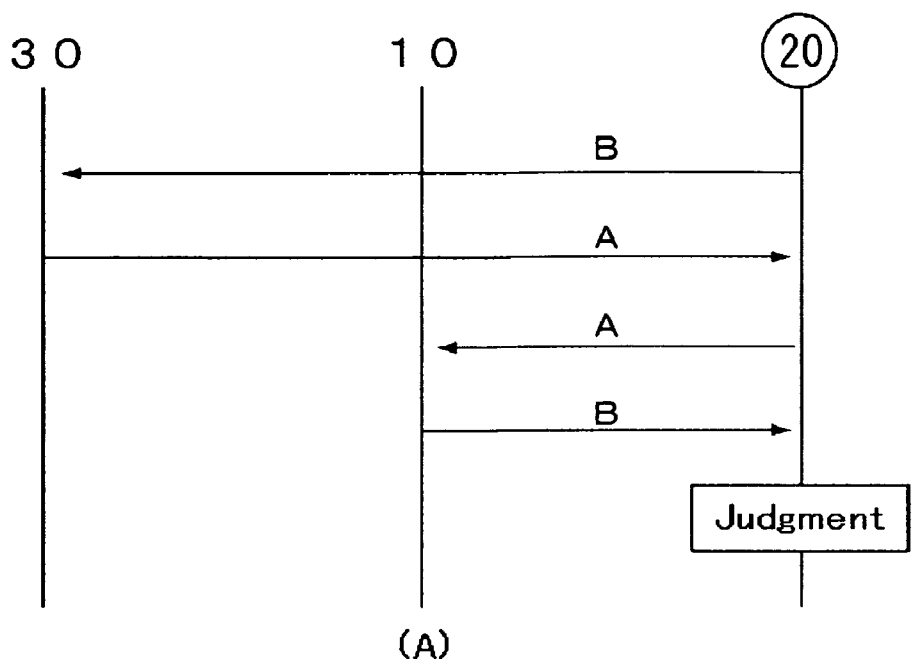
(A)
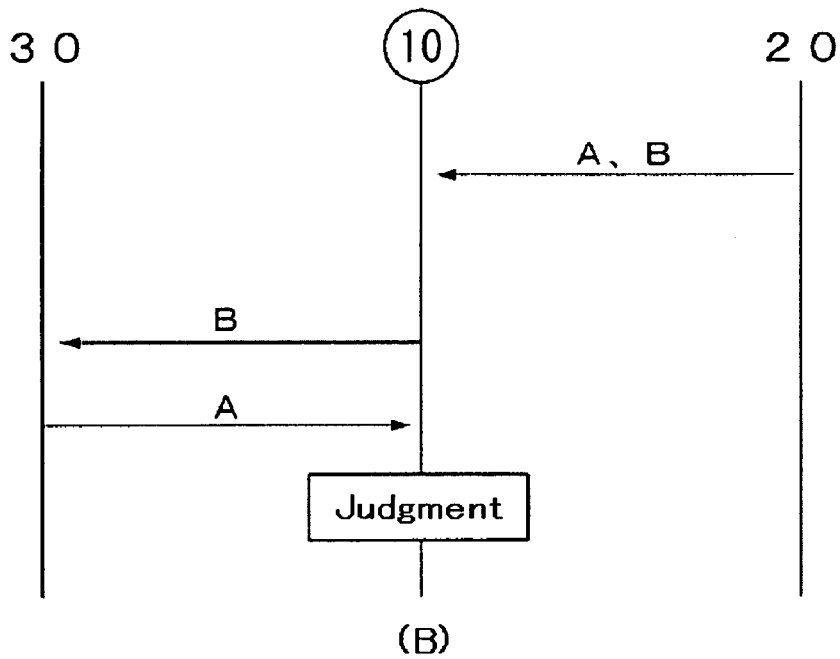
(B)
Fig. 40

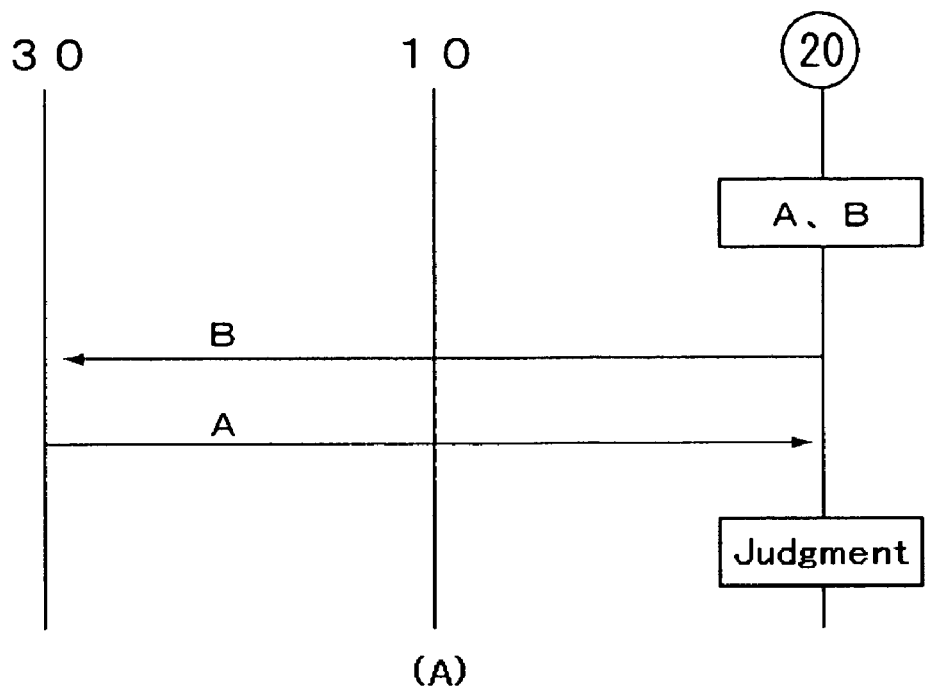
(A)
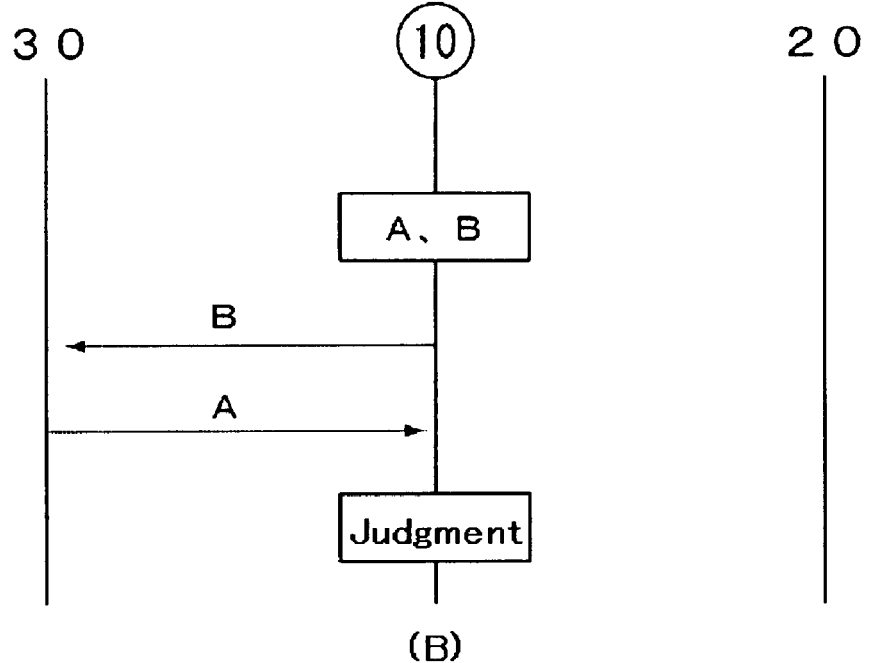
(B)
Fig. 41

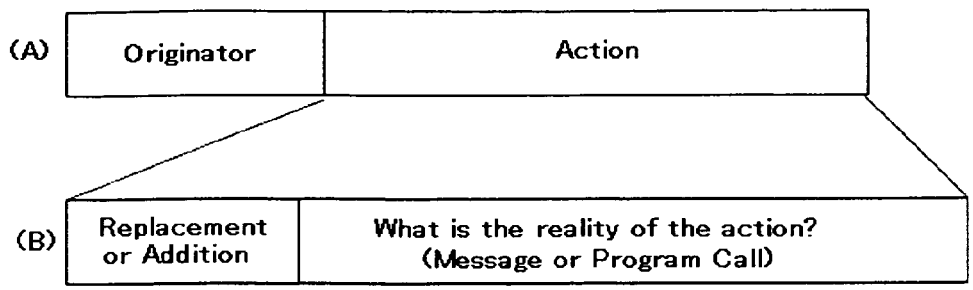
Fig. 53
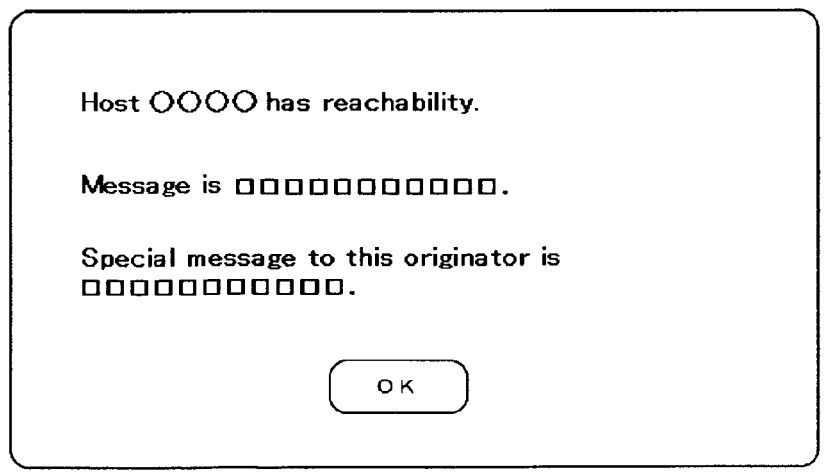
Fig. 54
Fig. 55

COMMUNICATION MODEL, COUNTER SIGN SIGNAL, METHOD, AND DEVICE

FIELD OF THE INVENTION

The present invention relates to a destination discovering process of a communication node dynamically assigned a network address and a preliminary communication prior to a real communication in a store-and-forward communication network.

BACKGROUND ART

After the commercialization of the Internet, general users have been using terminals which comprise transient addresses but don't comprise any identifiers for specifying as communication ends. There were requests for communicating with these terminals. First, it was attempted to leave specifying the communication end to a system in which a transient address follows an identifier set for specifying one communication end. Examples of these systems are webhop, IMPP (RFC2778, RFC2779), dynamic DNS (RFC2136, RFC3007), SIP (RFC3261-3265, RFC3856), ENUM (RFC2916, RFC3401-3406, RFC2761) and so on. (The above examples, except IMPP, are described as "mapping announcement system" hereinafter.)

Here, a communication could not be started unless the communication end was online, so it was important to know the reachability of the communication end before starting a real communication. This is the background of the necessity of presence.

"Presence is confirmation of the end's state before starting a real communication." An appropriate communication is started by knowing whether the communication end is on the network at present and the state of the communication end.

Examples of presence are "online/offline", "attended/unattended" and so on.

However, aren't the issues of "Is the communication end on the network at present?" and "What is the state of the communication end like?" on different levels?

The inventor has an uncle living with a sensor on his body. He is sick but not hospitalized. These people would know the personal state information. However, we hardly see these kind of people.

Basically, isn't user's state information one which cannot be strictly known? Isn't this originally information of a communication node?

"Attended/Unattended" is a case where the communication end is online, which is information showing the state of the person. Thus, online/offline is an issue before knowing the state. That is to say, "online/offline" and "attended/unattended" are on different layers where said information can be detected.

The representative of the provider of presence is IMPP at present.

Presence was detected by a server ("broker" hereinafter) for detecting presence once.

DISCLOSURE OF THE INVENTION

Problems to be Solved by the Invention

The state information of the communication end is detected among edge nodes, that is to say, without the broker.

Means for Solving the Problem (Difference with IMPP)

Destination on a communication model is different. This is shown in FIG. 1. (A) is an IMPP model and (B) is a reachability check model.

In IMPP model, the broker is a superficial destination and there is a real destination further behind it. The broker of IMPP is like a proxy response and an originator cannot know the real network address of the destination. For this reason, the edge nodes cannot communicate directly in IMPP model.

(Terms)

static identifier=An object in discovering destination. Usually used for specifying destination on a network. Specifically includes host name, handle name, URL and so on. Simply called "B" for matching with other documents of the inventor.

network address=Network address on a network, which conduct the actual access to communication nodes.

second communication node=A communication node used by one who wants to start a communication. Simply called "S" in case it plays a role of an originator.

first communication node=A communication node which was discovered by the originator at the start of a communication by a static identifier specified as a communication end. Simply called "T". (In case it was not discovered in the present application, it will be regarded as discovered by NULL value. That is to say, it doesn't matter whether the actual node is existence/nonexistence.)

Destination is a communication end which the originator intends to communicate with on sending. It is discovered by the static identifier. It should essentially be a communication node, though it may be changed into a communication node by someone. Description of "user" means "person".

mapping announcement system=a server or a system for announcing mappings of the static identifier and the dynamic network address. Simply called "D".

Means for detecting "online/offline" is invented in patent applications PCT/JP03/16538 (Patent Document 1 hereinafter), not published yet at the time of the present application by the applicant, and JP 2002-371448 as reachability check.

Basic sequence of Patent Document 1 is shown in FIG. 2.

In S102, the first communication node maps a pair comprising a static identifier and a network address assigned to the own node to the mapping announcement system.

In S104, the second communication node performs query to the mapping announcement system on the present network address of the first communication node for the static identifier showing the destination.

In S106, the mapping announcement system responds a network address corresponding to the static identifier which received query to the second communication node.

In S108, the second communication node sends a sign signal for requesting a countersign signal to the network address obtained in S106.

In S110, the first communication node responds a countersign signal.

In S112, the second communication node judges true/false of the reachability according to whether the stored "reply that should be made" is included in the countersign signal or not.

In S119, in case the result of the reachability check was true, it may be linked to the following processing, for example, instant messaging and others.

SUMMARY

Section 1: Countersign signal also carrying additional information

Section 2: Originator identification

Section 3: Countersign signal also carrying information for selective response using originator identification

TECHNICAL ADVANTAGE OF THE INVENTION

1. Among the edge nodes, that is to say, without a broker, we succeeded to detect the state information of a communication end.
2. Information which originally belong to different layers, mixed up in IMPP, was organized.
   In IMPP, "online/offline" and "attended/unattended" was integrated and undifferentiated.
   These are separated in the present invention as shown in the below table.

TABLE 1

| Stage of presence | Layer | What can be found | Conventional description | Proposal |
|---|---|---|---|---|
| Advanced presence | High | State information of the communication end | Attended/ Unattended | Additional information |
| Primitive presence | Low | Device reachability | Online/Offline | Reachability |

Therefore, the additional information indicates advanced presence.
Furthermore, the state information of a communication end can be separated as shown below

TABLE 2

| Stage of presence | Layer | What can be found | Conventional Description |
|---|---|---|---|
| State information of a communication end | High | State information of a person | attended/ unattended |
| | Medium | State information of a communication node | NA |

The state information of a person can be detected if a state information detecting means of a person is separately prepared. However, in IMPP, message is merely set by a person. For example, "busy" is handled as a message, not state information of a person, in the present invention.

3. In reachability check, only 2 values, whether it will reach the destination or not, can be known.
   On the other hand, in the present invention, the state information of the communication end can be known. In addition, a short message can be sent instead of the state information of the communication end. However, this is not in real time like instant message in IMPP and basically not an interactive communication. (In that sense, it is merely a message notifying system. If you need to communicate in real time, you may connect to conventional instant message, its alternative or others as a following processing.)
   The state information of the communication end may be either a state information of a human or a state information of an object.

BRIEF DESCRIPTION OF THE DRAWINGS

[FIG. 40] A diagram comparing Patent Document 1 with the sequence of the present invention.

[FIG. 41] A diagram comparing the communication model of the loopback test.

[FIG. 53] Record format

[FIG. 54] Telegram format

[FIG. 55] An example special message notifying screen of the second communication node.

EXPLANATION OF SIGNS 10 first communication node
20 second communication node
30 mapping announcement system
40 network

DETAILED DESCRIPTION OF THE PREFERRED EMBODIMENT

Block Diagram of the Entire Network

Figure 3:
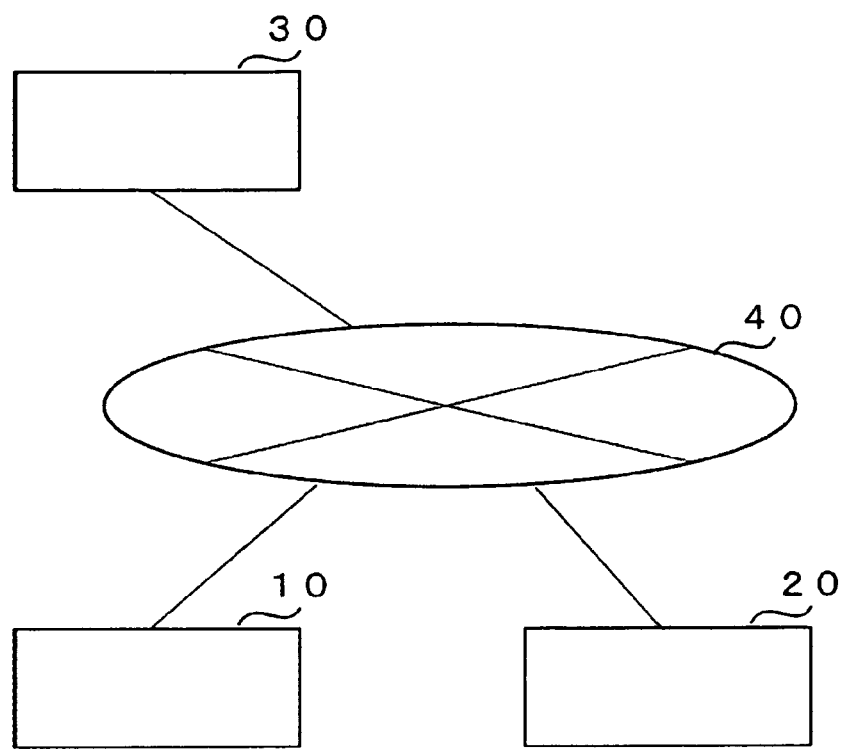

FIG. 3 is a typical system configuration diagram of the embodiment of the present invention. In FIG. 3, the first communication node, the second communication node and mapping announcement system returning dynamic network address of the originator communication node responding to query from the originating communication node show mutual connection via network 40 such as the Internet. Both of the first communication node and the second communication node include PC, cellular phone, router and so on.

(Countersign Also Carrying Additional Information)

Patent Document 1 discloses "That is, additional information can be included in a reply that should be made" in page 33, line 8, though this is not a very accurate description. More accurately, countersign can also carry "additional information" as well as "reply that should be made". Patent Document 1 does not disclose the specific means nor the usefulness of "countersign also carrying additional information". The ability of reachability check is the subject of Patent Document 1 which disclosed the countersign as a carrier signal realizing the reachability check. The present invention enables obtaining useful achievement by carrying not only the "reply that should be made" but also the additional information, which is described below.

The present invention is described based on the figures hereinafter. Parts with the same functions are assigned with the same signs in each figure. The descriptions below are examples, not limitations.

Theory for using the additional information, how to carry the additional information, how to separate the additional information from the carried information and what the additional information is useful for are described here.

The theory for using the additional information is described in the section of theory.

How to carry the additional information is described in the operation of the first communication node.

How to separate the additional information from the carried information is described in the operation of the second communication node.

What the additional information is useful for is described in Technical Advantage of the Invention. More specific examples are shown in Actual Application.

(Theory)

Figure 4:
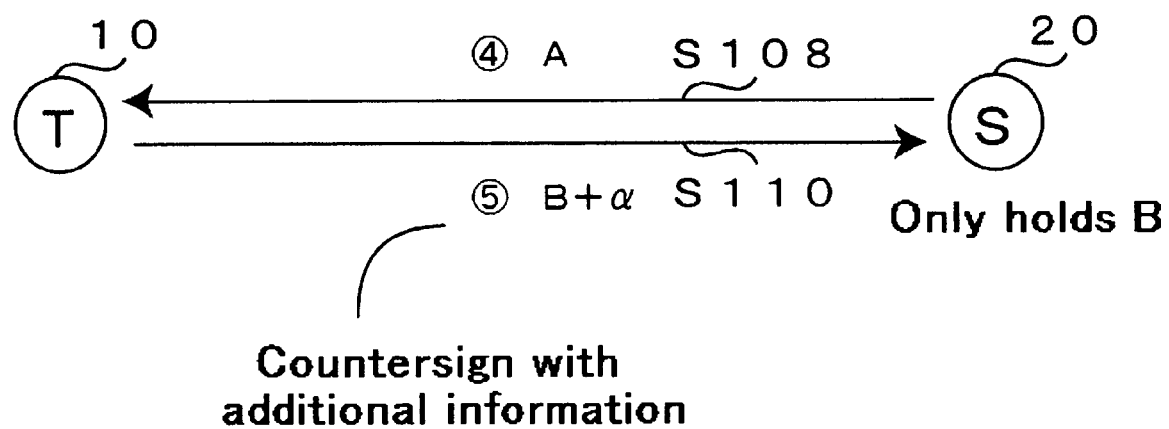
Figure 22:
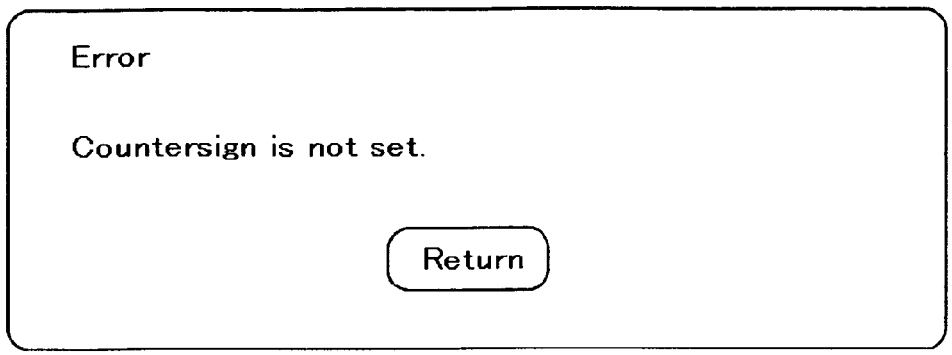

FIG. 4 shows the process cut out from FIG. 22 (4) to (5) in Patent Document 1.

In the second communication node, only the static identifier B, known as the "reply that should be made", is exemplified here.

In process (5), the countersign carries information "static identifier B+α" in the first communication node.

That is to say, α is the additional information.

The static identifier B is already known in the second communication node, so the residual part deducted this is the additional information. This is extracted and displayed.

Information merely adding the "additional information" to the "reply that should be made" may be carried by a countersign in the first communication node. (Refer to FIG. 5)

The "reply that should be made" is not limited only to the static identifier but follows the "type" shown in Patent Document 1. In that case, the static identifier B in FIG. 4 may be assigned following the type.

Format

Figure 7:
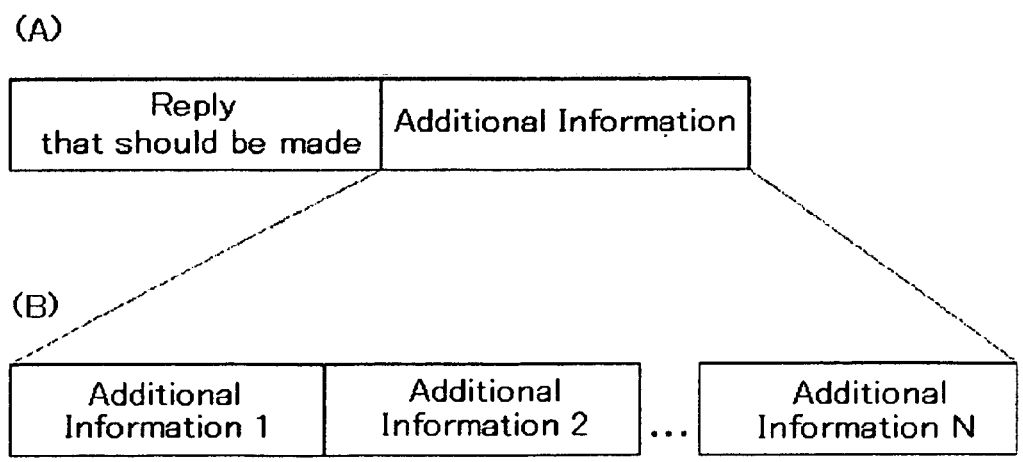

The information carried by the countersign follows the logic format in FIG. 7.

In addition, the logic format shown in FIG. 7 can also send the logic format as either 1 records or a plurality of records as disclosed in Patent Document 1.

The static identifier itself is the basic type for the "reply that should be made" and its variation follows "the type of the reply that should be made" shown in Patent Document 1.

A specific example of the format is given below.

Patent Document 1 introduced a method for embedding the "reply that should be made" in Daemon. In this case, the setting file of Daemon must be changed and recompiled, and Daemon must be restarted. Thus, this is not practical in case a countersign also carries additional information, because additional information is expected to be a kind of information which is changed in relatively a short time. However, Patent Document 1 also introduced a method for embedding in HTML sentence. This has no problem. If HTML is available, XML, SDP and others are naturally also available. In addition, additional information can be embedded by using "large number of CGI parameters, URL or others including long indefinite identifier" introduced in the section of "IDENTIFIER" of RFC2779.

Telegram will be long by embedding indefinite identifiers in succession, though these will not be regarded as identifiers (RFC2779), which can contrary be used as places for embedding the additional information.

A sample can be found in no time by referring to a dynamically responding webpage on the Internet, for example: http://www.example.com/search?q=%E7%AE%B1%E3%81%AE%E4%B8%AD%E3%8 1%AE%E5&ie=UTF-8&oe=UTF-8&hl=jao6lr From page 31, lines 1-3 and page 33, lines 12-15 of Patent Document 1, the reachability check is true when the string after removing unnecessary strings from the information carried by the countersign (S210 in FIG. 23, Patent Document 1) includes the "reply that should be made". The significant information carried by the countersign may include the information which is not the "reply that should be made". This is the origin of the additional information. That is to say, by intentionally adding the information which is not the "reply that should be made" in the first communication node, the part of no use in the information received in the second communication node will be the additional information.

The above example is usually used in POST request and others in HTTP.

Conventionally, variable names and variable values are connected with "=" and coupled with delimiters such as "&" or ";", so not only the "reply that should be made" but also the "additional information" can be carried on the countersign by these descriptions.

In this case, http:// is hard-coded information. Here, as already described, the static identifier itself is the basic type of the "reply that should be made" and the variation follows "the type of the reply that should be made" shown in Patent Document 1. That is to say, the "the reply that should be made" is necessary in case of URI scheme, though it should be ignored in other cases. Thus, at the time when the first communication node generates the countersign, in case the "reply that should be made" is not URI scheme, http:// should not be included. In addition, http:// represents protocol, though protocol is no object in the present invention. Therefore, it may be any protocol. This kind of description issue is not the essence of the invention. In this way, extracting the difference from the countersign shows that the additional information can also be transmitted.

The above description issue belongs to grammar or description, so further mention will not be made in the present specification. Nothing is stipulated on these grammar or description in the present specification. (The above matter is considered to belong to grammar. In Japan, grammar is considered to be an "artificial agreement", which is not subject to patent. In that sense, the above matter is not the essence of the present invention, which is merely giving an example of an available grammar.) However, an example was given to show the operability. In addition, protocol is also not stipulated. As already mentioned in Patent Documents 1 and 2, description and agreement can be freely designed.

Formats can be summarized as follows.

FIG. 7 is a telegram format. (B) includes a control header and obvious parts concerning protocol which are not in the figure, though these are omitted.

Figure of the record format stored in the first communication node is omitted. The "reply that should be made" may only be stored from Patent Document 1. The additional information is described in the description of S802. This is because the countersign also carrying the additional information is based on being dynamically generated after receiving a sign.

Figure 1:
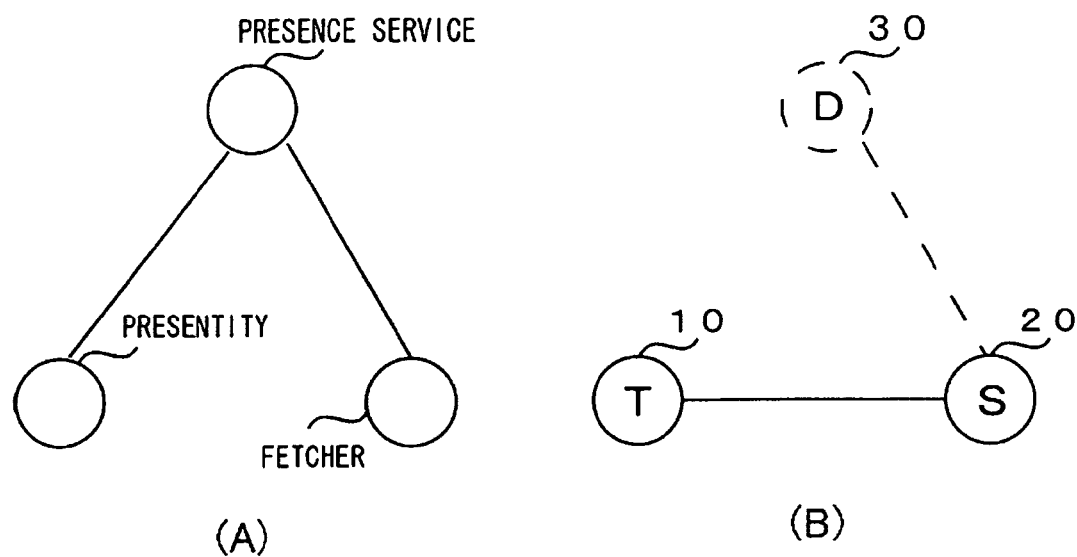
[FIG. 1] Comparison with IMPP
[FIG. 2] A diagram showing the sequence of the reachability check
[FIG. 3] A block diagram of the entire network
[FIG. 4] Communication model (theory)
[FIG. 5] The outline of processing in the first communication node (theory)
[FIG. 6] The first communication node is a router and the console is PC (operation of the first communication node)
[FIG. 7] Telegram format (theory)
[FIG. 8] Record recorded in the second communication node (theory)
[FIG. 9] A block diagram of the second communication node (operation of the second communication node)
[FIG. 10] A flowchart of the second communication node (operation of the second communication node)
[FIG. 11] A flowchart when changing and displaying the expression of the second communication node.
Figure 2:
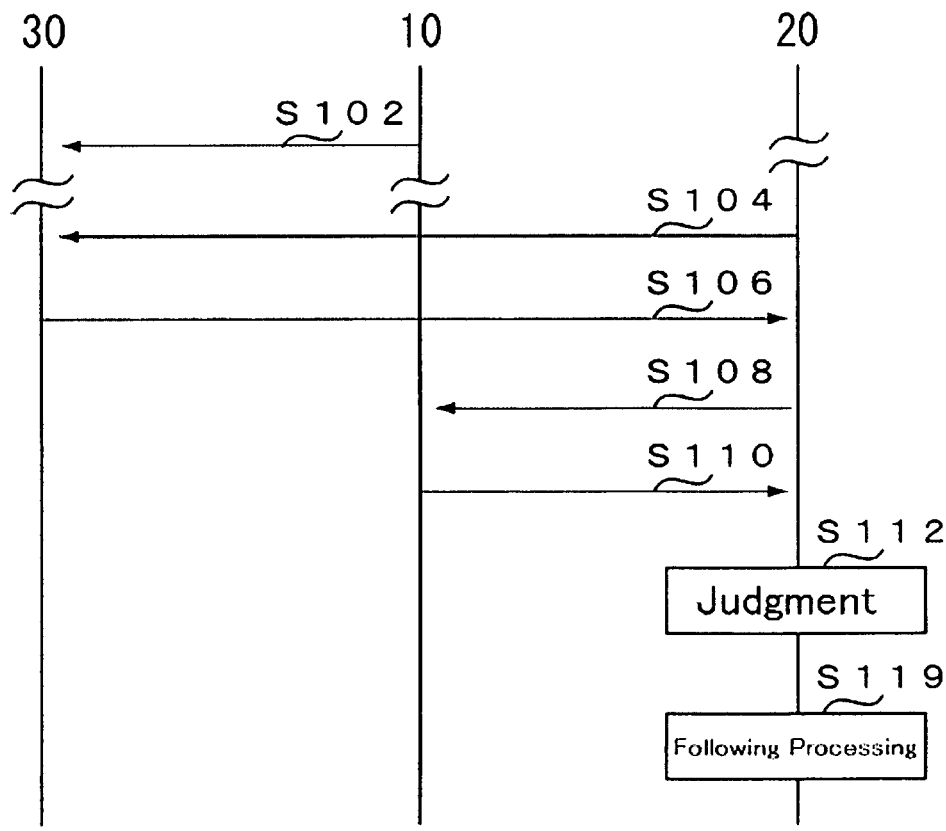
Figures 8, 9:
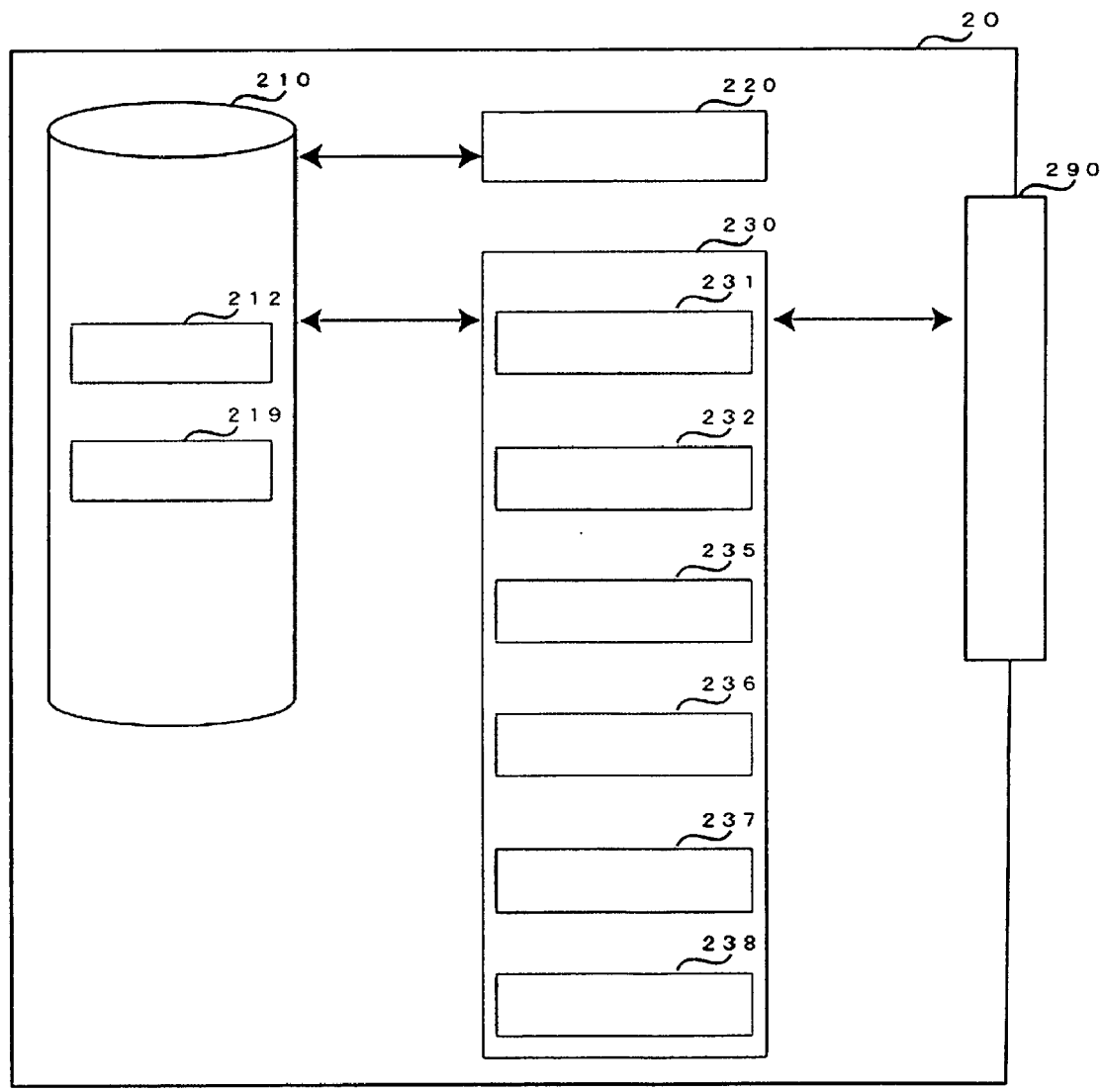

The record format stored in the second communication node is summarized in FIG. 8. However, FIG. 8 follows "the type of the reply that should be made" shown in FIG. 1. That is to say, in case the "reply that should be made" is obvious, the second communication node need not intentionally store as a record, for example, in case where the "reply that should be made" is the static identifier itself of the destination and other cases. In this case, the static identifier of the corresponding first communication node need not be stored, which is described in Patent Document 1. The static identifier as a destination can be manually inputted by the originating intention of the user of the second communication node. That is to say, this is a case when previous setting is unnecessary. In this way, not only a particular destination but also various communication nodes can be specified as destinations. FIG. 8 is equivalent to registered destination information 212 in FIG. 9 which is a block diagram of the second communication node.

(Description of the Second Communication Node)

FIG. 9 is a block diagram showing a typical configuration of the second communication node shown in FIG. 3. FIG. 9 shows, for example, a setting section 220 for providing user I/F such as console, a sending section 230 for controlling in the reachability check, a storage device 210 for storing various information and a physical communication I/F 290 for connecting to a network 40.

Console is not shown in the block diagram. Console may be a PC connected by serial or Ethernet, a pair comprising directly connected display and keyboard or others. This is same for the first communication node.

The sending section 230 provides a network address acquiring section 231, a sign signal sending section 232, a countersign signal receiving section 235, a judging section 236, an additional information processing section 237 and a displaying section 238.

The network address acquiring section 231 acquires addresses by performing queries to the mapping announcement system for the static identifiers relating to the first communication node.

The sign signal sending section 232 sends sign signals to the network addresses acquired by the network address acquiring section 231.

The countersign signal receiving section 235 receives the countersign signals sent from other communication nodes and transiently stores them in the work area 219.

The judging section 236 performs reachability check whether said countersign signals were sent from desired communication nodes based on the replies transiently stored in the work area 219.

The additional information processing section 237 extracts the additional information from the replies transiently stored in the work area 219 and deforms it to information which can be transferred to the displaying section 238.

The result of the reachability check, the contents of the additional information, if there is any, or others are displayed via the user I/F not shown in the figures to the user of the second communication node or connected to the following processing in the second communication node.

The main role of the second communication node is to separately display the additional information from the received countersign in addition to the reachability check disclosed in Patent Document 1.

Please refer to FIG. 4 again.

FIG. 4 is the process of the reachability check cut out from FIG. 22 (4) to (5) in Patent Document 1.

Sequence (5) is equivalent to S110 in FIG. 4. The second communication node receives a countersign.

The second communication node compares the "reply that should be made" extracted from this received countersign with held "reply that should be made" and confirms correctness (that is to say, correctness of the communication end) of the reachability to the first communication node.

"Unnecessary string is removed from the reply" (Patent Document 1, FIG. 3, S210) at the second communication node. Here, "unnecessary" may be considered as a grammatically obvious part. Then, only data is extracted.

Figure 23:
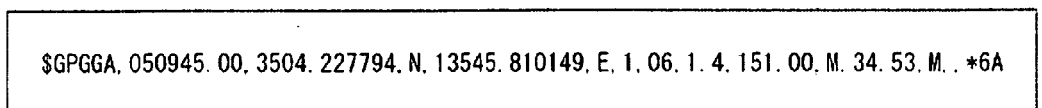

Next, "whether the reply match" is judged at Patent Document 1, FIG. 23, S212. However, as explained in the "Format" section, it need not match perfectly but it may be included.

These are technologies of Patent Document 1.

However, in case of including the additional information, need not match perfectly. However, the information carried by a countersign includes the "reply that should be made" of the first communication node. Only this part should match perfectly. That is to say, the additional information is the residual part deducted the "reply that should be made" from the received countersign in the second communication node.

The additional information may include delimiter and others. In XML and others, significant additional information can be obviously carried.

In this way, a countersign can carry additional information.

Figure 10:
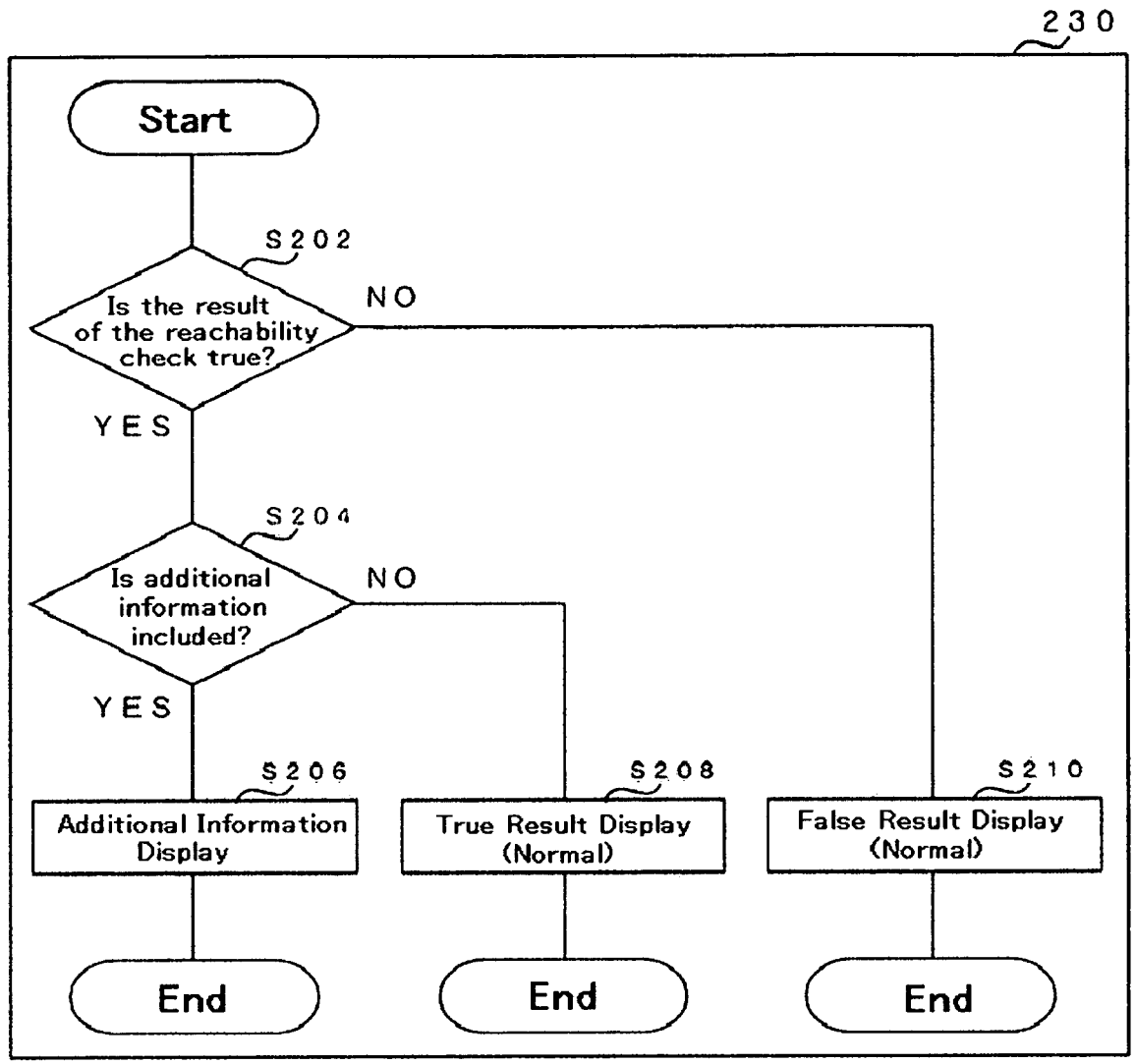

FIG. 10 is a flowchart of this.

S202 branches according to the result of the reachability check. S202 is equivalent to S212 in FIG. 23 of Patent Document 1. In addition, a step in reachability check, such as sending a sign, prior to S202 is necessary, which is omitted.

S204 is the part described so far. That is to say, it includes the part for storing until the additional information from the received countersign is separated and at least displayed. Whether the additional information is included or not is judged by whether there is a residual part (except the part where protocol is obvious) deducted the "reply that should be made" from the received countersign.

S206 displays the additional information with the result of the true reachability check. Here, this is the same in case of the filter shown in Patent Document 1, that is to say, in case of connecting to the following processing, not displaying.

S208 is the true result display of the reachability check. This is the technology shown in Patent Document 1. However, messages such as "No additional information" may be additionally displayed here.

S210 is the false result display of the reachability check, which is same as the one shown in Patent Document 1.

Figure 11:
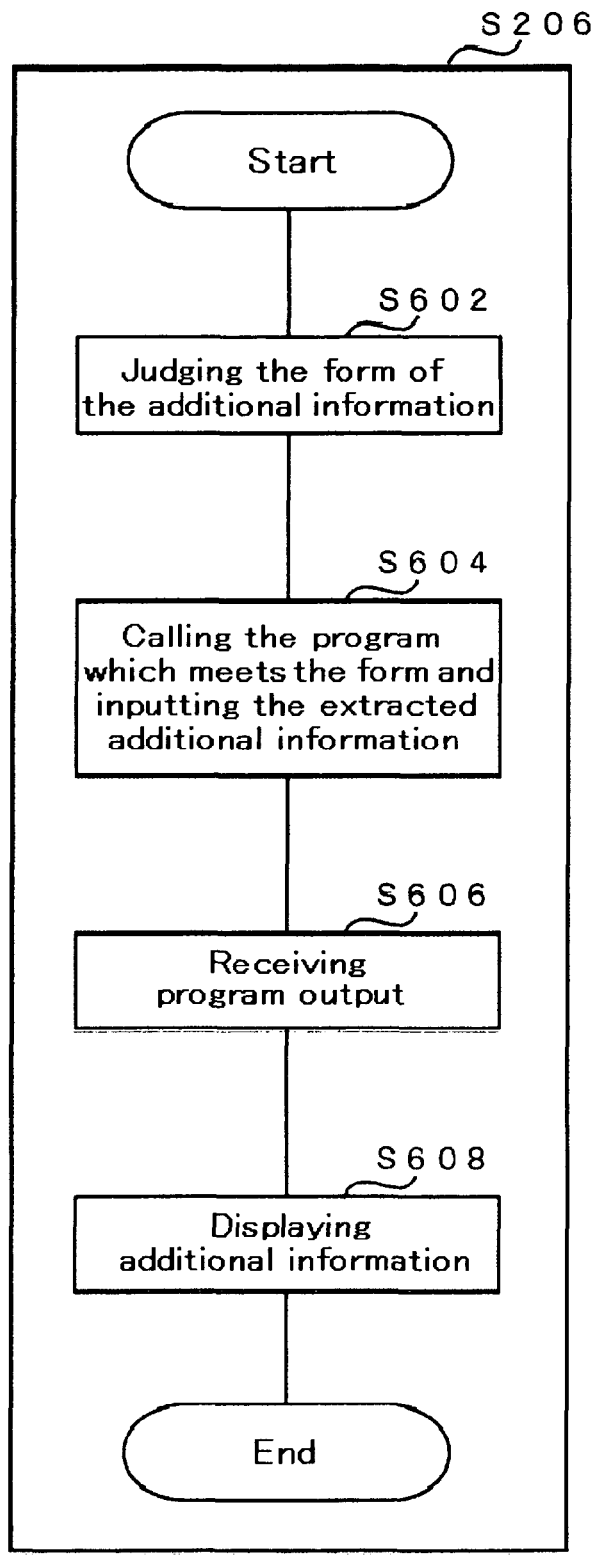

S206 may include the following steps. This is shown in FIG. 11.

S602 judges the form of the additional information.

S604 calls the program which meet the form and the additional information extracted (in S204) is substituted. (That is to say, a transient storage is necessary during this time. However, this is an obvious technology, which will not be described hereinafter.)

S606 receives the output of said program.

S608 displays with one meeting the expressive form. There are cases where strings are inputted but not outputted in said program, for example, image data and others. In these cases, S608 creates a result displaying screen for displaying images. Here, it is already known that the result of the reachability check is true, so the additional information is displayed with this. However, in case it is known that the user of the second communication node is not interested in the true result of the reachability check or in case it is used as a filter, the additional information may merely be displayed. The display includes creation of HTML statement, for example, in case of watching on a browser (This is obvious. If not, drawing means or scanning of cathode-ray tube must also be described.). Here, the point is to improve the convenience for the user of the second communication node by changing to an expressive form which is easy to understand.

This is useful for displaying the actual location of the first communication node and others, for example, in case a GPS output was received as a string as additional information.

However, this is optional. For example, in case the additional information is a message itself to a person, the expressive form need not be changed.

In addition, here, in case a plurality of additional information are included as shown in FIG. 07 (B), conversion shown in FIG. 11 may be repeated necessary times placing its limit at the number of the additional information.

(Description of the First Communication Node)

Figure 12:
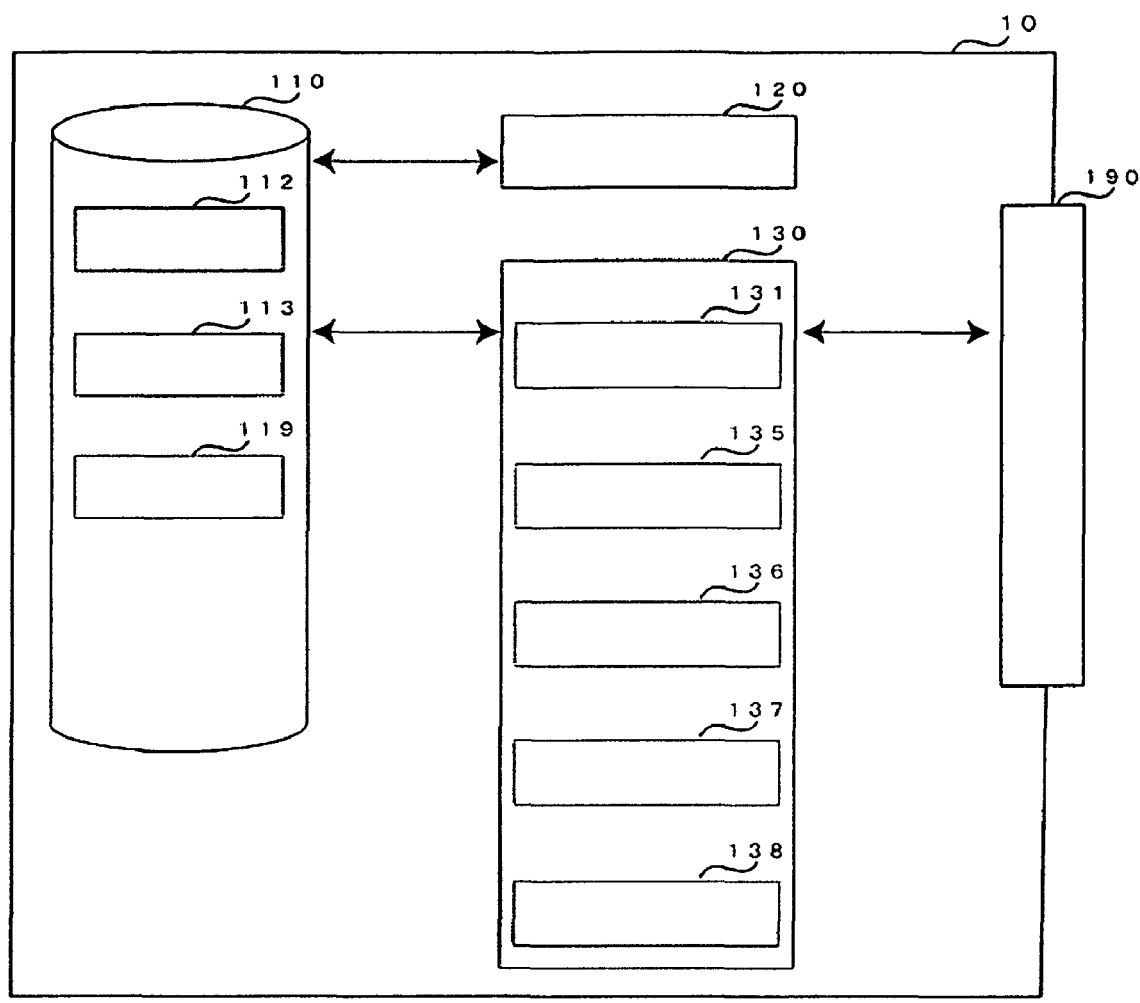
[FIG. 12] A block diagram of the first communication node (operation of the first communication node)
[FIG. 13] A flowchart of the first communication node (operation of the first communication node)
[FIG. 14] A flowchart of a program call of the first communication node (operation of the first communication node)
[FIG. 15] An example result display screen of the second communication node. (In case the result of the reachability check in Patent Document 1 is true) (A screen example of the second communication node)
[FIG. 16] An example result display screen of the second communication node. (In case the result of the reachability check in Patent Document 1 is false) (An example screen of the second communication node)
[FIG. 17] An example result display screen of the second communication node. (In the present invention) (An example screen of the second communication node)
[FIG. 18] An example setting screen of the first communication node (the scope of Patent Document 1) (An example screen of the first communication node)
[FIG. 19] Example additional information setting screen 1 of the first communication node (An Example Screen of the First Communication Node)
[FIG. 20] Example additional information setting screen 2 of the first communication node (An Example Screen of the First Communication Node)
[FIG. 21] Another proposal of additional information setting screen example 1 of the first communication node (An example screen of the first communication node)
[FIG. 22] An example error screen on setting the first communication node (An example screen of the first communication node)
[FIG. 23] An example output of GPS (An example screen of the first communication node)
[FIG. 24] A result display screen example of the second communication node. (An example map form display) (An actual application)
[FIG. 25] A result display screen example of the second communication node. (An example address form display) (An actual application)
[FIG. 26] A result display screen example of the second communication node. (An example map form display 2) (An actual application)
[FIG. 27] A diagram showing the relation of the host in case of mutually executing a receiving section 130 and a sending section 230 among the destination originators.

FIG. 12 is a block diagram showing a typical configuration of the first communication node shown in FIG. 3. In FIG. 12, for example, a setting section 120 for providing the user I/F of a console and others, a receiving section 130 for controlling when reachability is checked, a storage device 110 for storing various information and a physical communication I/F 190 for connecting to the network 40.

The receiving section 130 provides a sign signal receiving section 131, a "reply that should be made" reading-out section 135, an additional information processing section 136, a countersign generating section 137 and a countersign sending section 138.

The sign signal receiving section 131 receives the sign signals from the second communication node.

The "reply that should be made" reading-out section 135 reads out the "reply that should be made" from a "reply that should be made" storing section 112.

The additional information processing section 136 acquires the state information of the communication nodes or persons based on messages or a state information acquiring means stored in the additional information processing section 136. Here, the state information acquiring means is allowed to be a pointer to an external program stored in an additional information storing section 113.

The countersign generating section 137 generates countersign signals based on the output of the "reply that should be made" reading-out section 135 and the additional information processing section 136.

The countersign sending section 138 sends the countersigns generated by the countersign generating section 137.

An identifier storing section 111 showing the own node is used in mapping pair comprising a static identifier and a dynamic network address to a mapping announcement system, which is not necessary when reachability is checked.

The basic role of the first communication node is to implement the countersigns disclosed in Patent Document 1 while generating countersign signals with the embedded additional information.

Figure 5:
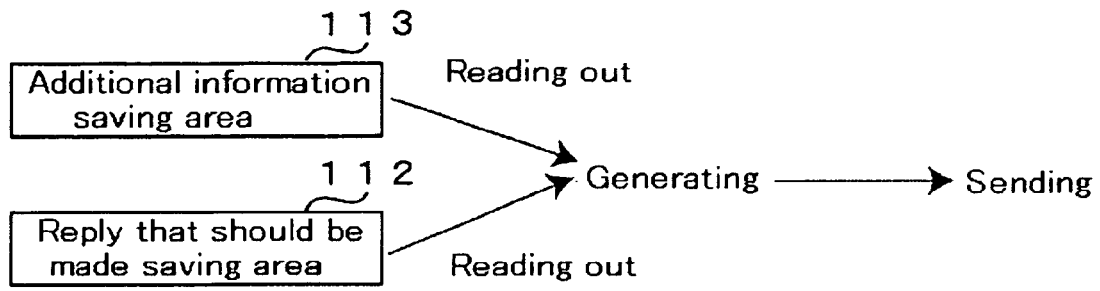

That is to say, the operation of the first communication node may be merely adding the "additional information" to the "reply that should be made" and carrying this with a countersign. This is shown in FIG. 5.

Figure 6:
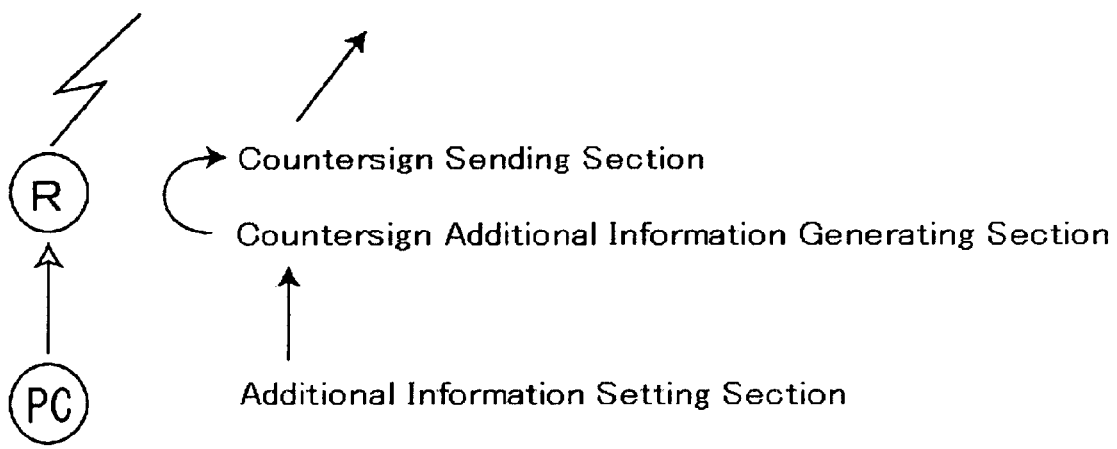

Here, as in the case of Patent Document 1, the first communication node may be network connection equipment or a terminal (including computer).

a. directly with a terminal b. in case network connection equipment returns a countersign, updated from a terminal to network connection equipment The image of case b is shown in FIG. 6. The terminal in b may be considered as a console described below.

Figure 13:
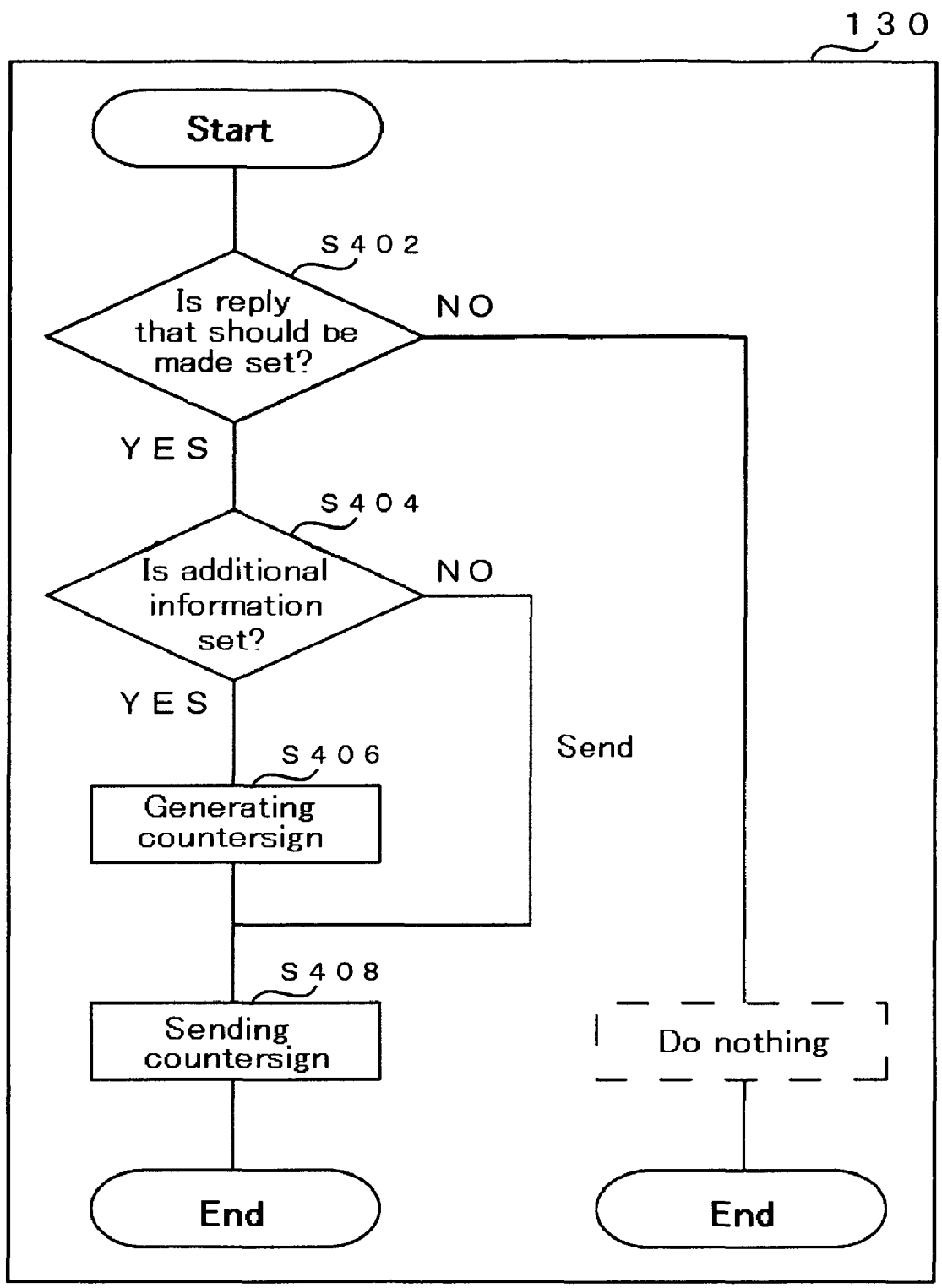

A flowchart is shown in FIG. 13.

FIG. 13 is a flowchart showing the operation in the first communication node when a sign is received.

This starts when a sign is received.

First, S402 judges whether the "reply that should be made" is set in the own node. When it is not set here, a countersign need not be returned. (However, this does not prevent the return itself of the countersign. That is to say, a reply of a countersign with empty sentence by the "reply that should be made" is included in "Do nothing" in FIG. 13. In case the "reply that should be made" responds a countersign with empty sentence, S402 can be omitted. Of course, in this case, the second communication node which received the countersign can only receive an unclear "reply that should be made", so the result of the reachability check will be false regardless of the actual reachability.)

S404 judges whether the additional information is set or not.

In case the additional information is stored, the additional information is set, so it goes on to S406. In case the additional information is not set, it skips S406 and goes on to S408. In case S406 is skipped, this is not different from the case in Patent Document 1. That is to say, the "reply that should be made" is included as an obvious thing (That is to say, reading-out of the "reply that should be made" is not shown in the figures.).

S406 is a step for generating the countersigns adding the "additional information" to the "reply that should be made".

S408 is a step for returning the countersigns. The result generated in S406 or merely the reply "that should be made" may be read out, carried by the countersign signal and sent out.

(Example Screens)

In case of the present invention, example screens will greatly help understanding the result display or how to set what kind of information.

The present invention is described based on the figures below. Parts with the same functions are assigned with the same signs in each figure. The following example screens are examples, not limitations.

(Example Screen of the Second Communication Node)

First, the example result display within the range of Patent Document 1 is shown.

Figure 15:
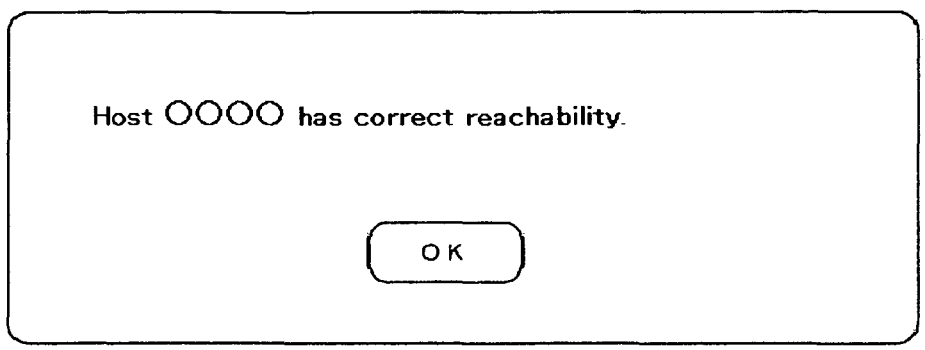

FIG. 15 is an example result display screen in case the result of the reachability check is true. The content of the message may be "online", "present" or "reachable" according to the case of the display of the actual application in Patent Document 1.

Figure 16:
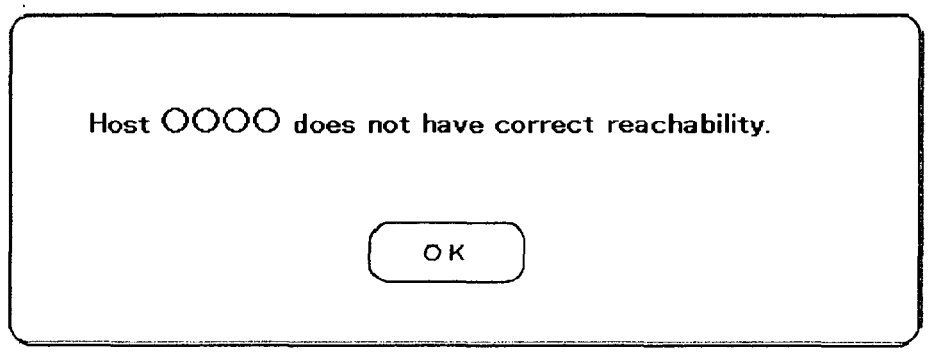

FIG. 16 is an example result display screen in case the result of the reachability check is false. The content of the message may be "offline", "absent" or "unreachable" according to the case of the display of the actual application in Patent Document 1.

An example result display of the present invention is shown.

Figure 17:
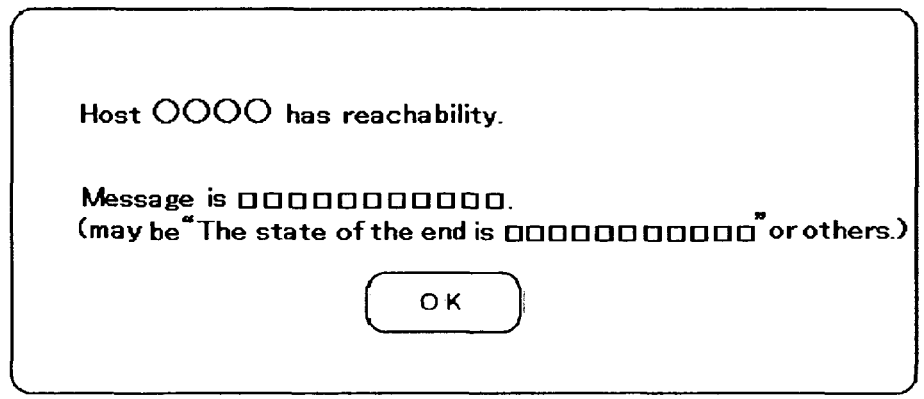

FIG. 17 is an example result display screen in case of the present invention. The additional information is also displayed in FIG. 17 compared with FIG. 15. Here, the content of the message may be "The state of the end is □□□□□□□□□□" or others.

(Example Screen of the First Communication Node)

Concerning the operation of the first communication node, how the additional information is set is described with an example setting screen.

Here, we wish to provide an image of what kind of information can be transmitted to the second communication node as an additional information through the example setting screen.

One of a plurality of radio buttons is selected. In addition, not all the errors but only the errors relating to the present invention are shown. For example, the error in case where any radio button was not selected is not mentioned because it is not limited to the present invention.

First, an example setting screen within the range of Patent Document 1 is shown.

FIG. 18 is a setting screen for the "reply that should be made". The setting screen displayed by the first communication node going on from Screen 1 to Screen 2 and returning to Screen 1-2 is shown in FIG. 18 following the procedure. Settings in Screen 1 is reflected in Screen 1-2.

Screen 1 is the so-called menu screen. Here, by selecting "Change" button of the countersign, it can move to the setting screen for the "reply that should be made" in Screen 2. The wording on the button may be "Set", not "Change".

In case the "Change" button of the additional information is pushed before setting a countersign (indicating the "reply that should be made") in Screen 1, it is kind if errors are displayed as shown in FIG. 22 for the following reason. If there is no "reply that should be made", there is no point in the "additional information" only. The countersign does not primordially work out without the "reply that should be made". (Please refer to "Unclear Response" in Patent Document 1. The result of the reachability check is judged false by "unclear response".)

Screen 2 is the setting screen for the "reply that should be made". Here, "Setting Countersign" is selected from the radio buttons and the "reply that should be made" is inputted in the input field.

The radio button selected in Screen 2 does not "Setting Countersign", but it is a message of "Setting reply that should be made".

Then, by pushing "Reflect" button, it returns to Screen 1-2. Here, Screen 1-2 means Screen 1, which is Screen 1 where the content set in Screen 2 is reflected. The example screen of 枝番付is the same hereinafter.

In case the button for changing the additional information is pushed in Screen 1-2, it moves to Screen 3 which is the setting screen for the additional information.

The above descriptions again describe the examples when setting the "reply that should be made" described in Patent Document 1 according to the example screens.

Next, example setting screens of the present invention are shown.

FIGS. 19 and 20 are additional information setting screens. The below message or state information can be notified as additional information.

Screen 3 in FIG. 19 is the setting screen of the additional information. Here, many wording examples which can be carried as additional information were given. From the top, "Select Pattern" and "Free String" are mainly the case of the state information of persons.

"Select pattern from pull-down menu" is for selecting example pattern among Sleeping, Taking a Bath, Eating, Gone Out and others.

There is Free String, so it can be used for a simple one-way notification. ""出奔します。Don't search." and others can be given as examples. In addition, compliments of the season such as "A happy new year." or advertisements and others such as "New product X" may be good. (This example may be symbolic. The present invention is not for exchanging messages, but for merely notifying. In terms of push/pull, it belongs to pull. It can be considered as reversing the direction of mail or short message. It would venture to say "passive notification". Messages can be exchanged by exchanging the roles of the first communication node and the second communication node each other.)

The above example can often be seen in conventional IMPP.

However, the function of a presence server (that is to say, a broker) in IMPP is not merely moved to the communication node on the edge side in the network.

Then, "Program Output", "Substitute External Program Output" and "Plug-in" are examples of the state information of the communication node.

Program output and internal variable can be embedded in countersigns as additional information.

Followings are the advantageous points compared with IMPP:
scalability
flexibility In case of "Select program output from pull-down menu", ones often seen as the state information of the communication node (not person) are exemplified. For example, variable in the first communication node may only be referred for Memory Utilization. However, CPU Load Factor, Traffic Condition and others usually need aggregation. Its often the case that Memory Utilization is not stored as variable, so the access means to these information usually goes through a program.

In addition, ones not included in the pull-down menu are enabled to separately start-up an external program and to substitute its output to the additional information. Argument can be put on just like inputting with command line. This may be inputted in the input field.

The external program may be started up with trigger of generation in FIG. 13, S406.

Figure 14:
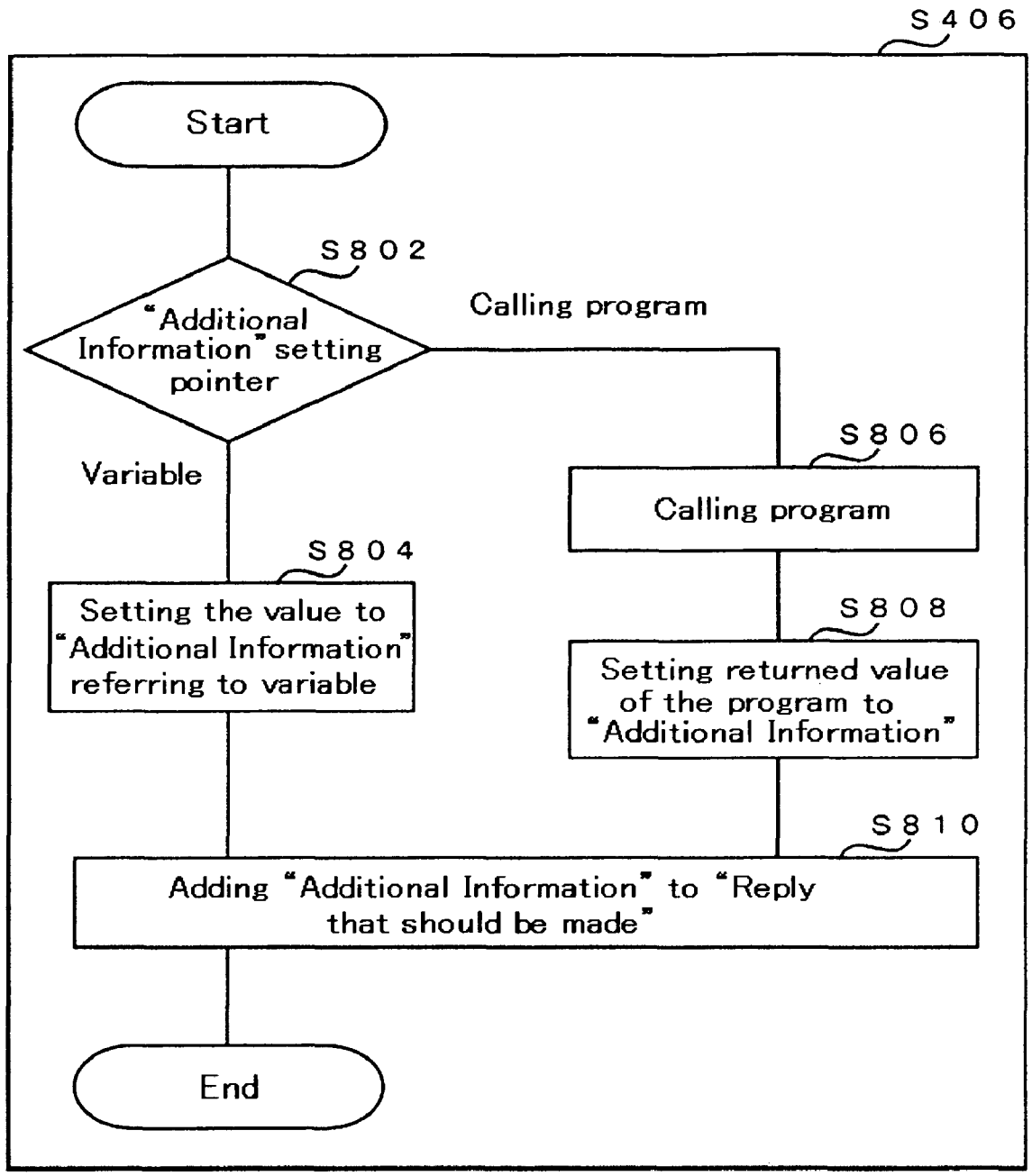

Only some notes are given for FIG. 14.

An additional information setting pointer in S802 is a pointer generated after the additional information setting is finished in FIGS. 19 and 20, where the acquiring method of the additional information stored in the additional information storing section 113 is described. In FIG. 19, Screen 3, the stored variable may merely be indicated in "Select Pattern" and "Free String". In addition, "Program Output" and "Plug-in" is used in case of calling a program. Thus, the content of the additional information setting pointer is a storage of either a variable or a program call as a flag, a variable name if it is a variable, a program calling method if it is a program and other information. Then, it is branched according to this, and, after going through the required procedures (obtaining a variable or a returned value of the program), a postscript of S810 is added.

In addition, in case the returned value of the program is not a character which is able to be carried, it may be converted to a string which can be carried in S808. However, at this point, it is not necessary to be a meaningful string for persons. By the series of processing in FIG. 10, S206 or FIG. 11 at the second communication node, it may be deformed in a meaningful expressive form for persons at the time of displaying.

Plug-in is already a general concept. In the present invention, it is considered as follows.

Plug-in indicates expansion module for adding functions in general. The expansion module is a part or a program which can easily be detached or replaced. Here, it is merely a mechanism for setting the output of the external program as a content of the additional information. The largest function is that it may be a communication module for external devices in some cases.

The actual positioning of plug-in in the present invention is merely replacing one which is considered to be often used among "substitute output of external program" or (/and) one which is difficult to prepare normally by "plug-in" (location on the display was moved).

Screen 4 is an example selecting screen of plug-in. It is expressed as a popup window, though it may be a normal screen, not a popup window. After selecting plug-in, it usually shifts to the program setting screen selected as plug-in.

Here, plug-in is started up with trigger of receiving a sign. (in case "Plug-in" is selected as a generating method of the additional information in Screen 3 and Screen 4)

The plug-in function is distilled to the followings.
1. Local variable is obtained.
2. The external program or subroutine is called, and the returned value is obtained.
3. The returned value is obtained by communicating with an external communication node or a device.

1 may be added as a function by plug-in when the local variable cannot be directly referred. In that sense, 1 and 2 are same. 3 indicates a device which is not a communication node. For example, a measuring device but not a communication node, which can collect data via bus or serial.

In case of 3, information which cannot be directly obtained by a communication node which is the first communication node within a range able to be seen integrated from outside can be additional information. This is considered using a specific example.

An example for obtaining location information by communicating with a GPS receiver is given. The format may be converted in some cases.

All the characters can obtain the location information by "sentence" of ASCII text depending on standards. Sentence indicates a record for exchanging data with the GPS receiver.

For example, please refer to FIG. 23.

In case it is expressed as a string, it can directly be embedded in the additional information. In this way, in case of a meaningless string for persons, it is kind to deform it to a meaningful expression for persons and display by FIG. 11 at the second communication node. For example, the above GPS output may either be displayed as a string showing the address or as a map. A specific example of this is shown in the actual application.

Plug-in is an external program. The returned value of this external program is set in the additional information. It may be written on the tip of a pointer showing the storage area showing the additional information in particular.

The GPS receiver usually communicate through RS232C serial. There is no problem in most routers where serial port exists, though in a smaller device, for example, in case of NATBOX, it's often the case that serial port doesn't exist. In such case, the end which plug-in communicates may be a GPS receiver or a communication node such as a PC or others connected with a GPA antenna. As a plug-in operation in this case, the returned value from the communication node may merely be set in the additional information.

By the way, an example deformation of FIG. 19 is shown in FIG. 21.

In FIG. 21, "Substitute External Program Output" in FIG. 19, Screen 3 is changed to be displayed in "Select Plug-in". In this case, the screen for specifying the call method of the external program may be inputted by a popup window or others. In other words, "Program Output", "Substitute External Program Output" and "Plug-in" shown in Screen 3, which are means for collecting the state information of the communication node, set the output result of the external program as contents of the additional information.

FIG. 20 shows a case of returning to Screen 3 in case "Location Information by GPS (PC)" is selected in plug-in. It should be noted that a message displaying the set content is added below radio button "Plug-in". This is Screen 3-2. Here, by pushing "Reflect" button, it returns to Screen 1 which is the menu screen. In this case, the message with the set content reflected is shown in Screen 1-3. The reflection of the message content is changed from Screen 1, Screen 1-2, Screen 1-3 and others to clarify that it is set for convenience of the description so far. It may/need not be changed in implementation.

In case "Not Setting Additional Information" in FIG. 19, Screen 3 is selected, it merely intends not to set the additional information obviously, which does not need description.

Information such as interface linkup speed or application usage, information which individually identify hardware such as vendor code/product number/serial number or firmware version, network setting information in case of network connection equipment and others can be carried as additional information other than the examples shown in the figures. These are not shown in the figures, which can be changed accordingly (Actual Application)

The direct beneficiary of the present invention is the second communication node.

Please remind "S206 may include the following steps" described in operation of the second communication node.

Granted that the content of the carried information is like a GPS output in FIG. 23, and in case it is a string or one converted to a string, the following is enabled.

Figure 24:
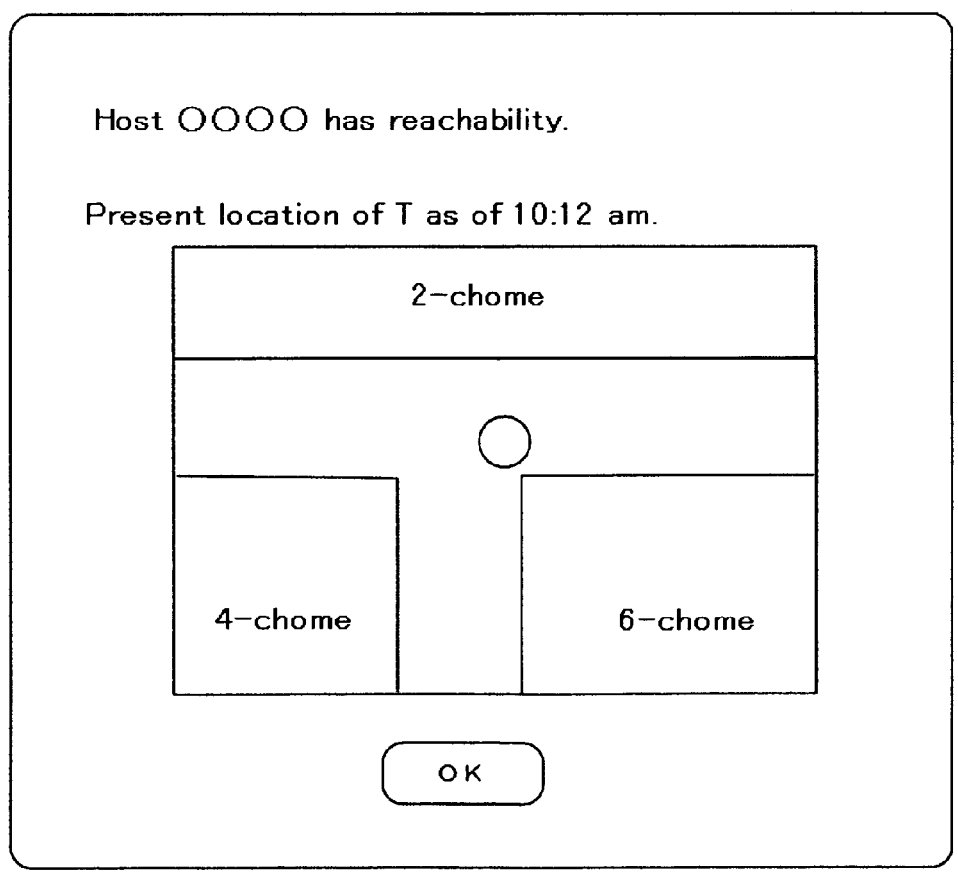

An output matching with the expressive form, for example, the expressive form of a map image showing the actual location of the first communication node can be adopted by the form judgment on the additional information, for example, as shown in FIG. 24.

FIG. 24 shows a case displaying a conversion to a map.

Figures 25, 26:
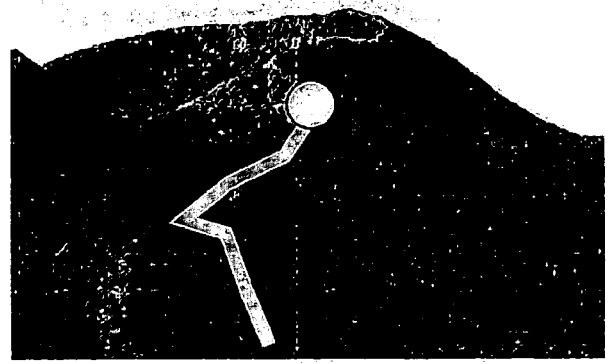

FIG. 25 shows a case displaying a conversion to an address.

FIG. 26 shows a case displaying the track on which the first communicate node has moved and the actual location of the first communication node. We will add that this shows the route when climbing a mountain just in case the figure is unclear.

The second communication node was described in the present invention as a fetcher in IMPP. Pola merely repeats executing the fetcher, so, by repeating the operation of the fetcher at regular time intervals, the movement history of the first communication node can be obtained. FIG. 26 is a case showing the history information as the track of the movement of the first communication node and with the actual location of the first communication node.

There is already a service provided by mobile phone companies which comprise a similar effect. However, this uses base-station service number for managing the place where the mobile terminal is placed which is necessary for establishment procedure of individuality in the mobile phone system. However, this is a service closed in the network of specific phone companies. Furthermore, there is no mechanism for notifying the location of the first communication node via store-and-forward network. Thus, it does not damage the patentability of the present invention. By the way, is location information of the first communication node is can be replaced by not only the GPS output but also the base-station service number. At any rate, in the second communication node, the additional information carried form the first communication node can be displayed, converting into an easily viewable form for persons. This kind of process is important in case of the information of which the reachability cannot be checked such as the GPS output exemplified in FIG. 23.

In case of S-1 displaying the result of the reachability check for the public, the means for knowing the location of the first communication node can be provided to the communication node which cannot check the reachability. In this case, at S-1, it may be a system for identifying the contractor by log-in and for providing the location information of the first communication node only to the contractor.

Of course, "case where the location information is obtained by communicating with a GPS receiver" is an example. It may just be a device existing outside in the first communication node. This may be a thermometer or a measuring device. A carrier signal for notifying (passively sending?) the information obtained in this way to the second communication node is a countersign signal for also carrying the additional information. The benefit in this case is that the measurement data shown by the devices such as a measuring equipment which doesn't comprise any network address can also be known from remote locations. By the way, in case the first communication node involves a GPS device, it may merely refer to the information stored by GPS in the first communication node or set as the additional information after obtaining said information via a program. This case may be considered merely as same as the example of "Program Output".

(Application of the Additional Information)

The contents of the additional information can be broadly classified as follows.

1. the state information of persons (that is to say, message)

2. the state information of communication nodes (or sensor output)

1 is the case using it as IMPP substitution. Here, for example, the state information "busy" of a person is carried as additional information. However, there is no method for identifying whether the information "busy" indicates the state of the person or is other information. That is to say, persons understand the contents. Eventually, merely the message notification is the essence in this case. (We questioned "Isn't the state information of a person in IMPP able to be known originally?" at the beginning. This is the answer, which is not the state information of a person but merely a message from person to person. That is to say, "busy" is not state information but a message.) This is obvious from that it is information set by a person in IMPP.

2 was difficult to use in IMPP. IMPP assumes exchanges between persons. Therefore, this kind of machine processing part was a poor field. For example, the state information of the end can only be obtained after log-in and so on. (Actually both need to be logged in. The concept of log-in originally does not exist in the present invention.). As described above, in this case, it may not only be the information of the destination communication node, but also the data collected by measuring equipment or others connected to the destination communication node.

Consequently, the application of the additional information should be considered from the standpoint in which scene it will be useful. Any information can be carried as a additional information.

(Essence of Presence)

A preliminary communication may be performed prior to the real communication when the originator wants to communicate.

In case of IMPP, the characteristic of the preliminary communication in presence was not so emphasized. The aspect of real time was more emphasized. JPA 2003-296259, paragraph 0004 (Background Art) may be referred to as an example. "In the conventional presence technology, queries for the state of the interlocutors registered in the terminal are performed at equal and very short intervals (10~30 seconds). The reason is that, in a communication, to know whether the end is able to communicate or not when one wants to contact him/her is very important, and in order to realize this, approximate real-time state confirmation is necessary" This represents the general recognition in IMPP. However, this realizes awareness, not preliminary communication. Unlike IMPP, the state of a communication end need not always be acquisition. If it is always acquisition, it cannot be called a preliminary communication.

That is to say, the timing of presence detection may only be when the originator wants to communicate. Therefore, real-time characteristic like an electrocardiogram is not necessary in the present invention. The flow will naturally be dramatically reduced compared with IMPP model.

The essence of presence is not in awareness, but in preliminary communication.

This enables more detail control which could not be realized in IMPP. For example, in case real-time characteristic is necessary for accuracy of data collecting, the poling interval of the second communication node may only be shortened. The timing may be an arbitrary timing which the second communication node desires. The important thing is that the second communication node can determine the timing without following the timing which the broker unilaterally imposed.

By the way, in case of IMPP, there were many satisfying cases without connecting to instant messaging which is the following processing. In the similar way, in the present invention, there may be cases where the originator can be satisfied by knowing the state information of the destination without connecting to the real communication.

The invention so far is opened to the communication end. Unlike IMPP, presence information is not mutually exchanged by the registration of the interlocutors. Anyone and any communication node can refer to the additional information of the first communication node.

This is the inferior point compared with the conventional IMPP.

Consequently, the first communication node shows a means for selectively responding according to the communication end to the second communication node.

In order to realize this, the first communicate node must be able to identify the second communication node.

This is called originator identification.

In this case, the destination discovering process where the static identifier of the first communication node belongs and the destination discovering process where the static identifier of the second communication node belongs need not be the same destination discovering process.

(Originator Identification)

This is mentioned in Patent Document 1.

As described so far, the first communication node is the destination at the start of a communication.

The second communication node is the originator at the start of a communication.

In Patent Document 1, the first communication node can know the static identifier of the first originator (that is to say, the second communication node) by sending a sign signal to the second communication node as an originator when the first communication node received the sign signal.

Figure 27:
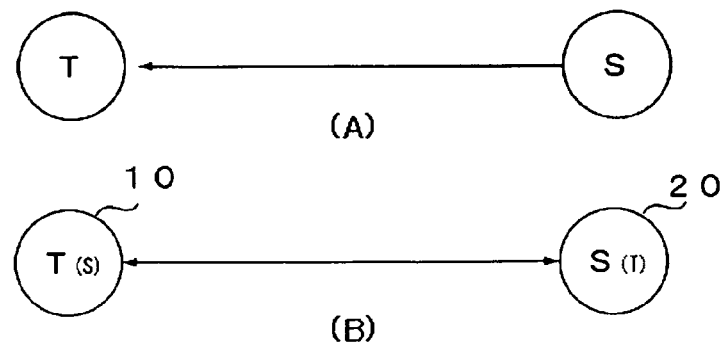

This is shown in FIG. 27. (A) shows the case in Patent Document 1 and (B) shows the present invention.

In the present invention, receiving a communication in a position as a destination which is the first communication, the first communication node communicates as a originator setting the second communication node as a destination. Thus, their positions are reversed.

The relation of the originator and the destination can easily be understood taking phone as an example. One making a phone call is naturally the originator. The one taking the phone call is the destination seen from one making the phone call.

Phone call is a two-way communication, though a relation between one making a phone call (originator) and one taking the phone call (destination) exists. That is to say, this relation is determined according to whom intended to make a phone call. That is to say, the originator here indicates the communication node used by one whom intended to start a communication.

The above reverse of relations cannot exist in circuit switching but can exist in store-and-forward, which is intended in the present invention.

Unlike the case of circuit switching, unless the network ensures the originator ID, the first communication node must ensure the static identifier the name of which the originator merely gave by itself by comparison with the mapping announced by the mapping announcement system.

However, the following problem exists.

The destination's operation, where the destination receives (before returning a countersign signal, in order to know the static identifier of the originator) and sends a sign signal, is contradictory.

Originally,
a response is returned to a request.
A countersign is returned to a sign signal.
It should be operated in this way.

However, in the above case, a sign signal is returned to a sign signal.

In this case, a request can be returned to a request. In this sense, this is a contradiction for the originator (in the daily life of persons, a question in response to a question is troublesome).

Figure 28:
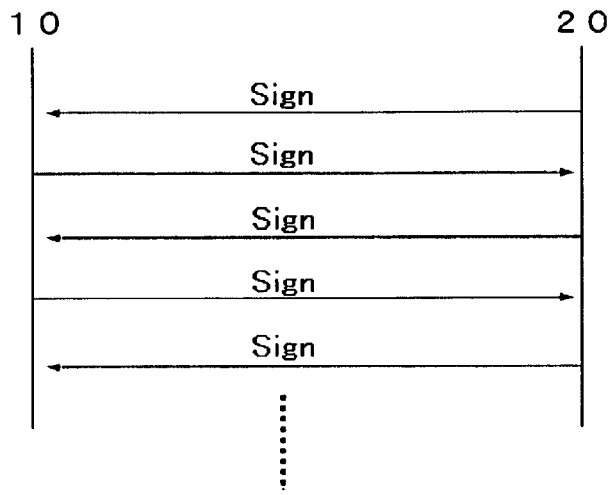
[FIG. 28] A diagram showing a ping-pong phenomenon occurring in case the destination and the communication node of the originator is equivalent.

In case the configurations of the first communication node and the second communication node are the same, in practice, ping-pong phenomena, as shown in FIG. 28, occurs In case the network in which the first communication node is placed is in an external environment where reachability can be checked, there are disadvantages such that both of them will be in waiting state until both of them go time-out and result in failure of the reachability check, and so on. These problems are generically named deadlock hereinafter.

Figure 29:
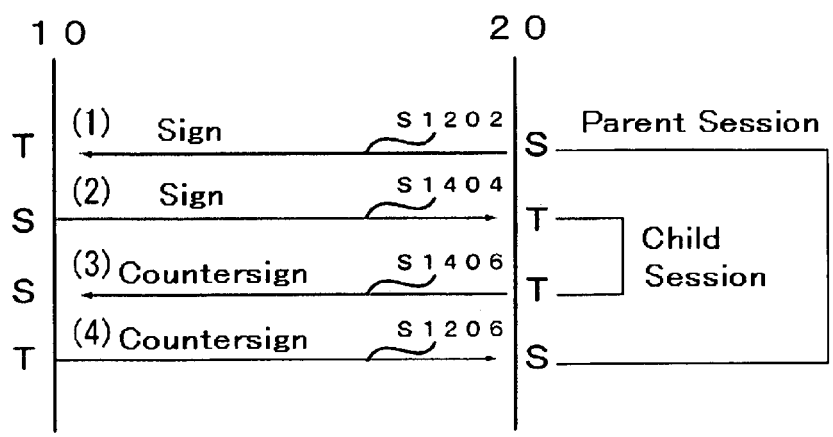
[FIG. 29] A sequence diagram showing the process for the destination to know the originator.

The operation in FIG. 29 resolves this. T shows the role of the destination and S shows the role of the originator hereinafter.

In case a sign signal, not a countersign signal, was responded to a sign signal, another sign signal is prevented to be responded.

Here, in the first solution, deadlock is avoided by detecting "a case where a request is returned to a request". Therefore, the important thing is how to make too sharp a distinction between "a case where a request is returned to a request" and "a normally requested case".

The originator detects a sign signal for a sign signal by listing the destination addresses where the sign signals were sent on sending sign signals and listing the originator's addresses when sign signals are received. This is shown in embodiment 2.

The second solution is to include the static identifier of the originator in the sign signal. This is shown in embodiment 4.

(The Effect of Originator Identification)
1. The communication node which is the destination can identify the communication node which is the originator with the static identifier.
The communication node which is the first destination on the sequence of the communication
can know the correctness of the reachability by the static identifier
of the communication node which is the originator.

In this way, one communication node playing roles of both the originator and the destination is realized.

Taking a radio as an example, a two-way radio is more convenient than one with separate transmitter and receiver.

Embodiment 2 is a basic solution.

In the present invention, the originator communication node and the destination communication node were invented not to be independent but to play both roles in one single communication node. Thus, the configurations of the first communication node and the second communication node are same.

As a result, for example, 110 provided in the first communication node and 210 provided in the second communication node are substitutable. The present invention is described with smaller numbers. This is same with the work areas 119 and 219, the setting section 120 in the first communication node and the setting section 220 in the second communication node, and, the communication I/F.

Figure 30:
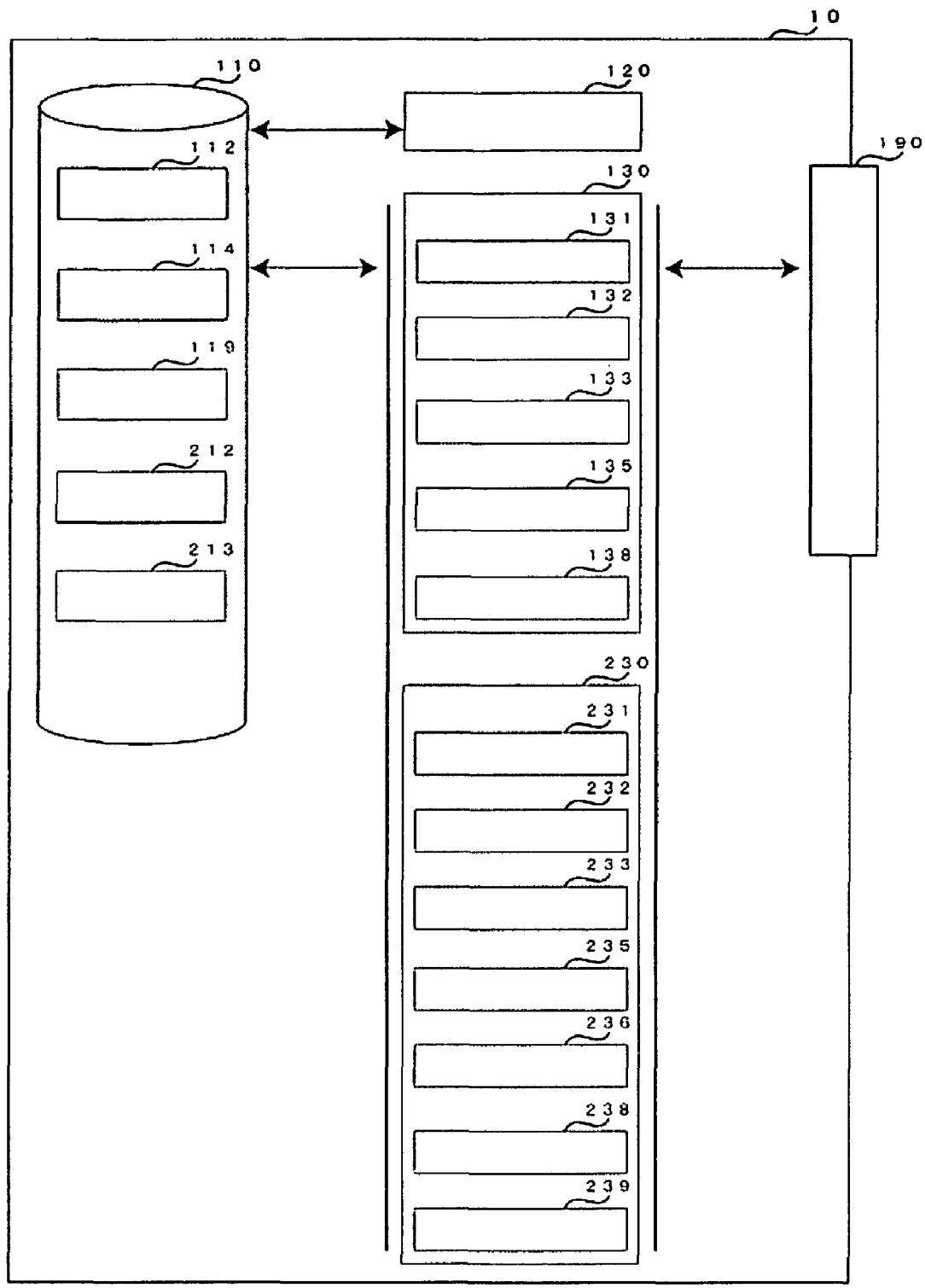
[FIG. 30] A block diagram in case the roles of the destination and the originator is played by a communication node. (embodiment 2)

A block diagram showing a typical configuration of the communication node for executing the present invention is shown in FIG. 30.

The followings are the changes from the block diagram shown above.

The receiving section 130 provides the sign signal receiving section 131, the "reply that should be made" reading-out section 135 and the countersign signal sending section 138. The additional information is not handled here, so the additional information processing section 136 and the countersign signal generating section 137 are unnecessary. Instead of these, an originator identifying section 132 and a matching processing section 133 are provided.

The originator identifying section 132 is connected to the sending section 230 provided in the own node for knowing the static identifier of the originator when receiving a sign signal. It stores the static identifier B which could be known as a result, or, the result of the judgment of the judging section called in the sending section 230 in an identified originator storing section 114 for referring in the following processing.

The matching processing section 133 detects whether the received sign signal is a sign signal for originator identification or a normal sign signal, that is to say, whether it is a parent session or a child session.

The sending section 230 provides the network address acquiring section 231, the sign signal sending section 232, the countersign signal receiving section 235, the judging section 236, the displaying section 238 and a timer 239. The additional information processing section 237 is unnecessary because the additional information is not handled in the present invention. A sign list processing section 233 is provided instead of this.

The sign list processing section 233 stores the destination network address where the sign signal is sent in the sign list 213.

Figure 31:
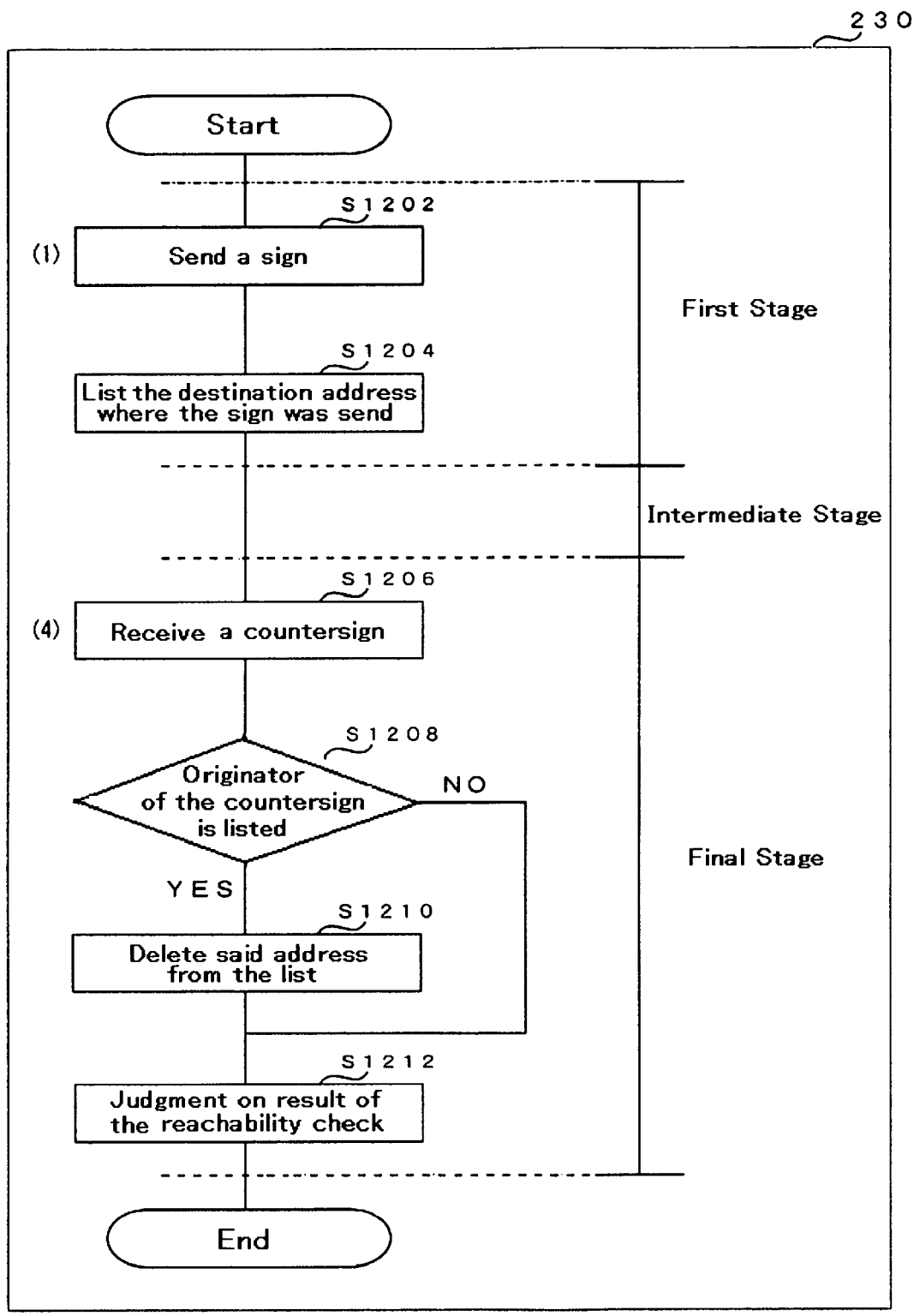
[FIG. 31] A flowchart showing the operation of the originator from sending the first sign signal to receiving the countersign signal. (embodiment 2)

In the sending section 230,

FIG. 31 is a flowchart showing the operation of the sending section 230 (from sending the first sign signal to receiving the countersign signal).

S1202 is performed by the sign signal sending section 232, which is equivalent to sequence (1) in FIG. 29. Prior to S1202, in case of the second communication node, the network address acquiring section 231 obtains the network address of the first communication node by performing query to the mapping announcement system 30. The first communication node knows the network address of the second communication node from the originator network address included in the header of the first received sign.

S1206 is performed by the countersign signal receiving section 235, which is equivalent to sequence (4) in FIG. 29.

Thus, form S1202 to S1206 is the series the process of sign and countersign from the sign signal in Patent Document 1, FIG. 23, S206 to the countersign signal received in S208.

For this reason, step S1204 is added in the present invention. In S1202, the sending section 230 lists the network addresses of the destinations which are destinations where the sign list processing section 233 sent the sign signals in S1204 in the sign list 213. Either S1202 or S1204 may come first.

This is the first stage.

Figure 32:
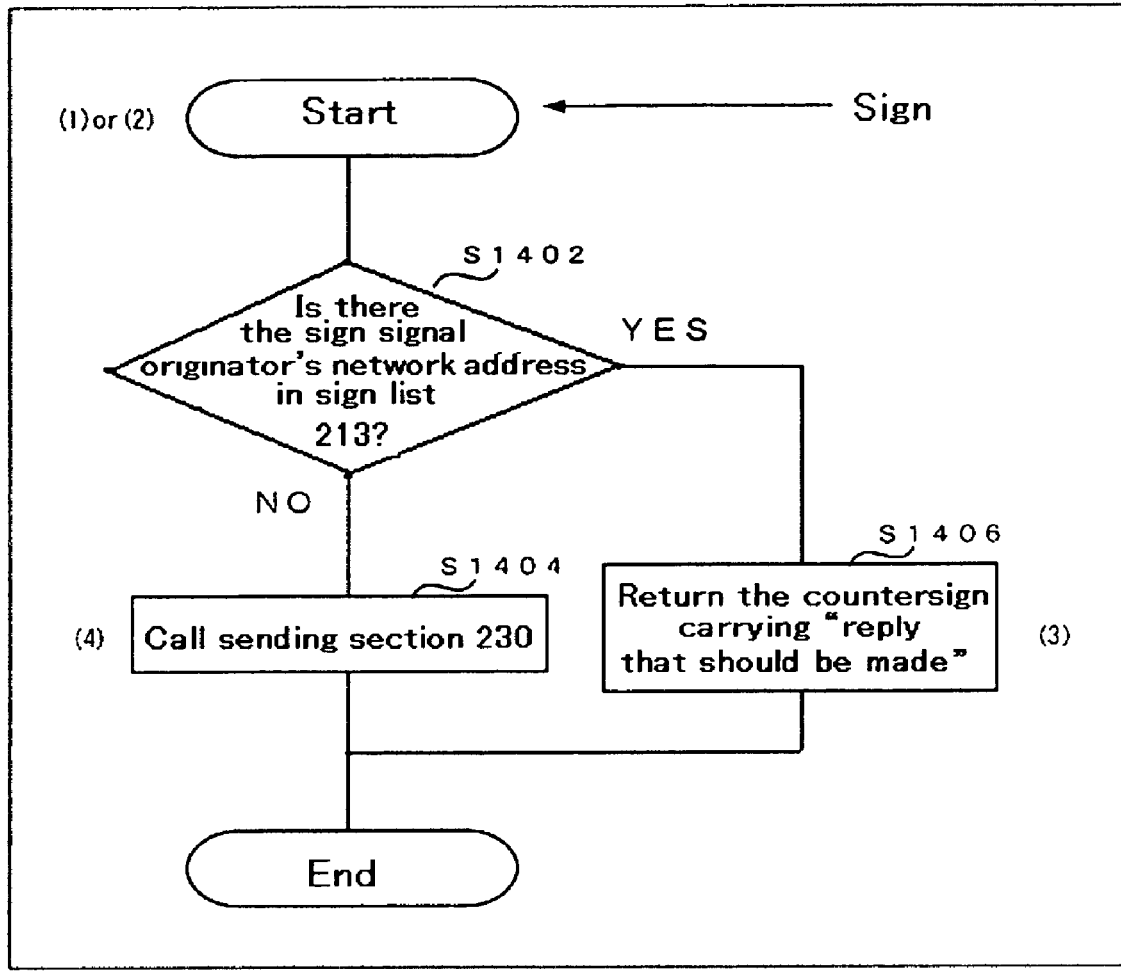
[FIG. 32] A flowchart showing the operation of the destination in case a sign signal is received. (embodiment 2)

In case the communication end returned a sign signal, please refer to FIG. 32 described later. This is the intermediate stage, though FIG. 32 shows the operation of the receiving section 130, which is not shown in FIG. 31. Therefore, "the network addresses of the destinations where sign signals were sent are listed" in S1204 for judging whether the sign signal is from the communication end where the originator of the sign signal has already sent a sign signal when the sign signal is received in FIG. 32.

In case the communication end didn't return a sign signal (that is to say, in normal case where the countersign signal was returned), it goes on to S1206.

In case a countersign signal was not returned, the reachability could not be checked, which is not shown in the figures (Patent Document 1).

S1206 shows that the countersign signal receiving section 235 received the countersign signal. The final stage begins here.

In S1208 and S1210, the sign list processing section 233 judges whether the network address of the countersign signal originator received in S1206 is listed in the sign list 233. When listed, it goes on to S1210. When not listed, S1210 is skipped.

In S1210, said network address is deleted from the sign list 213. The network address of the destination where the sign signal was sent need not be stored any longer because the series of sign and countersign process has finished.

The format per record in the sign list 213 may be network address only. However, the time of the sign signal (or the timeout time until the countersign signal for the sign signal is received) may be included.

In the receiving section 130, the first solution for the problem is to configure so that the countersign signal for carrying only the "reply that should be made" in no time is returned to the additional sign signal received from the communication end sending the sign signal.

FIG. 32 is a flowchart showing the operation of the receiving section 130 (when receiving a sign signal).

FIG. 32 is the intermediate stage omitted in FIG. 31. That is to say, both FIGS. 31 and 32 show the operations in the communication nodes with the same configuration.

"Start" in FIG. 32 shows that receiving a sign signal starts as a trigger.

Therefore, "Start" is equivalent to the receiving side of sequence (1) or (2) in FIG. 29 (that is to say, the destination which is the sign signal receiving side).

S1402 is a step for judging whether the received sign signal is equivalent to the parent session or the child session. The matching processing section 133 judges "Is there the sign signal originator's network address in sign list 213?". Here, in case the network address is listed, it is the destination where the sign signal is already sent (FIG. 31, S1204). In case of YES, it goes on to S1406, and in case of NO, it goes on to S1404. That is to say, a sign signal with an originator of a network address which is not listed is a normal sign signal (equivalent to the parent session), which is judged.

S1404 is a step for starting the child session. The originator identifying section 132 "Call sending section 230" (which may be considered as equivalent to sort of a subroutine). Here the called sending section 230 operates as shown in Patent Document 1. That is to say, in this case, a sign signal is sent without listing (as shown in dashed line in FIG. 33).

In addition, in sending the sign signal executed in S1404 (S1202 in the child session), the timeout time may be shortened by the timer 239. The parent session needs two times of communication time than the child session in simple calculation.

S1406 is a step for sending a countersign in the child section. The countersign sending section 138 "Return the countersign carrying "reply that should be made"". The point is that "the sign signal is not returned". When the sign signal is returned in S1406, deadlock occurs.

The step of "Delete said address from the list" in FIG. 31, S1210 may be performed after S1406. Said step is for preventing unnecessary information from being piled up in the list, which is adjustment of contradiction, not the essence.

Figure 33:
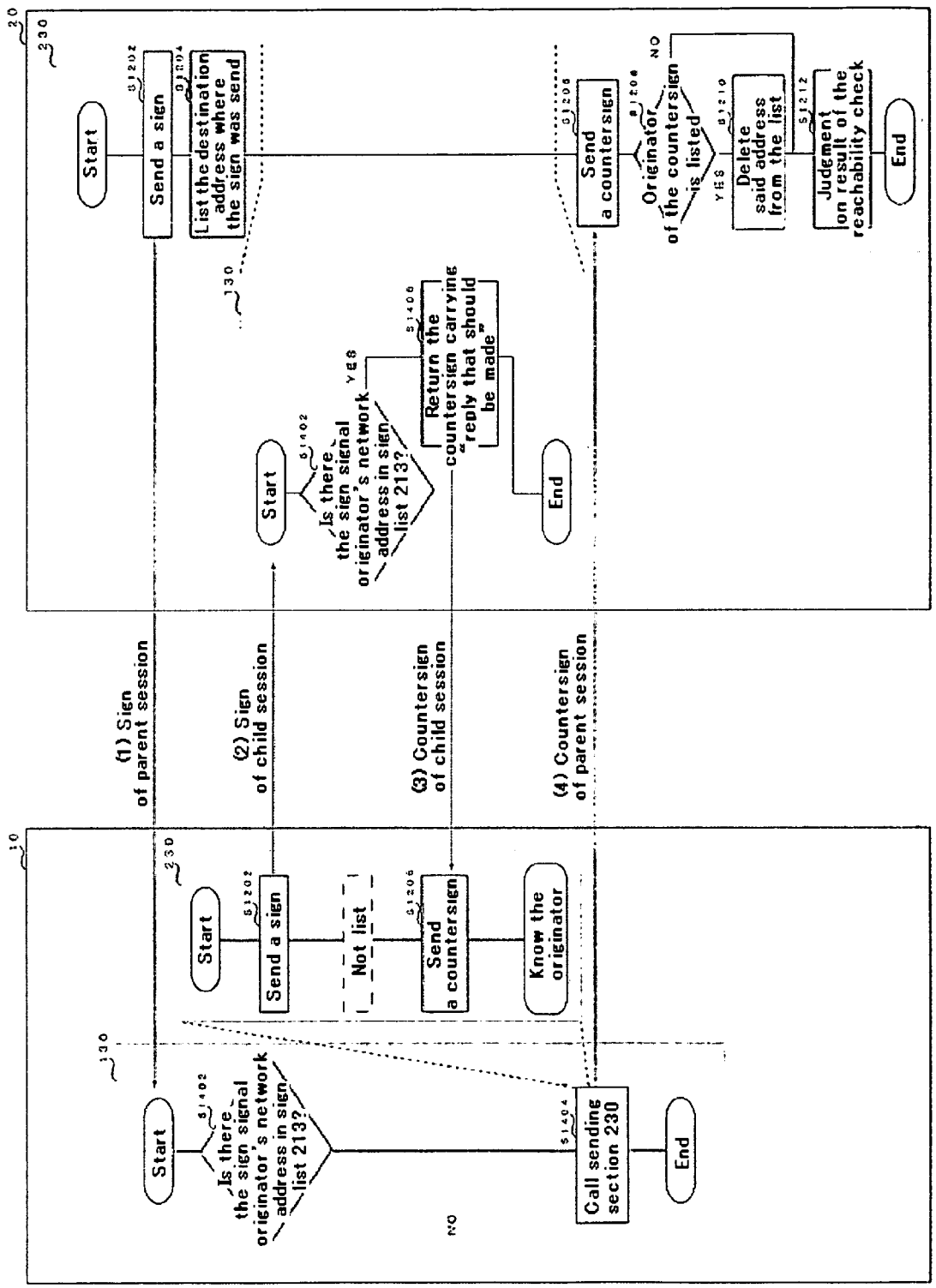
[FIG. 33] A diagram showing a flowchart as sequences of the second communication node and the first communication nodes.

FIG. 33 shows the description in the flowchart so far applied to the sequence.

The most significant point is described hereinafter.

In the sending section 230 of the second communication node, the destination network address where the sign list processing section 213 sent a sign in S1204 is listed in the sign list 213. This sign list 213 continues in S1402 of the receiving section 130. In this way, too sharp a distinction is made between "a case where a request is returned to a request" and "a case where normally requested". As a result, the countersign signal of the child session is sent in S1406 in the second communication node. In this way, additional sign signals are not sent to the sign signal of the child session.

The second significant point is that the sign list 213 is independent in the second communication node and the first communication node. The sending section 230 and the receiving section 130 shares the sign list 213 for referring in a single communication node. As an example, when receiving a sign signal in the first communication node, it is naturally not listed because a sign signal is not sent. S1402 performed in the sign list processing section 139 of the first communication node branches and connects to S1404 "Call sending section 230" (that is to say, not S1406).

(Reachability Check for Originator)

By the way, in case it is necessary to know not only the static identifier of the originator but also the correctness of the originator, S1404 may additionally call the network address acquiring section 231 after this and judge the correctness of the reachability in the judging section 236 after performing query to the mapping announcement system. In the first communication node, after S1206 (not in the figures), if the reply that should be made carried by the countersign signal is the static identifier itself, a mapping can be obtained from the mapping announcement system after this. In this way, the 4 elements necessary for knowing the correctness of the reachability are obtained, so the correctness of the reachability for the originator can be known. In addition, here, a query may be performed to a mapping announcement system which is not the mapping announcement system providing the destination discovering process where the first communication node belongs. In case it is not the static identifier B itself, it is required to be reversible from the reply that should be made to the static identifier. In case the correctness of the originator need not be known and only the static identifier of the originator is needed, reference to the mapping announcement system is unnecessary. In the second communication node, query to the mapping announcement system is finished before sending a sign signal to the first communication node.

FIG. 33 shows an example of the operation of a typical communication node following the sequence, where same devices may be used for the second communication node and the first communication node.

Maintenance of the sign list 213.

Figure 34:
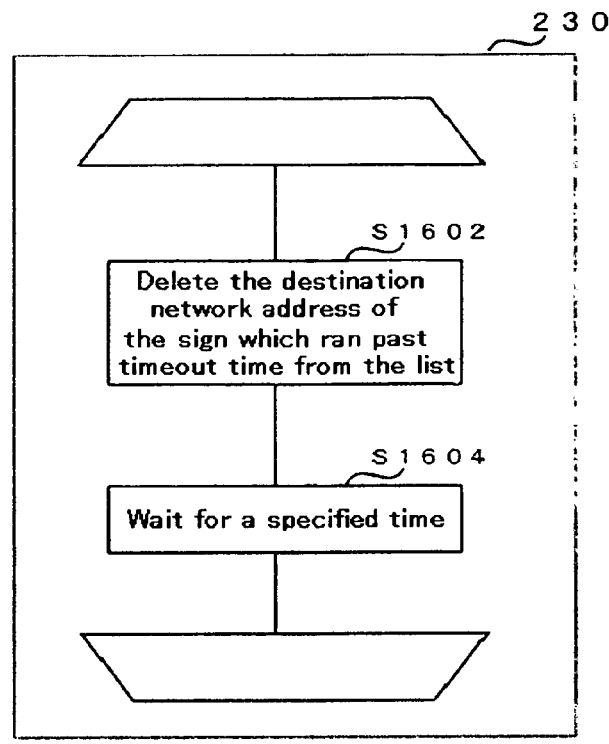
[FIG. 34] A flowchart showing the operation of the originator in case the countersign signal did not return. (embodiment 2)

FIG. 34 is a flowchart showing the operation of the sending section 230 (in case a countersign signal was not returned).

In case the countersign signal receiving section 235 of the sending section 230 didn't receive a countersign signal (a representative example is a case where it was judged false in the reachability check), maintenance should be performed for the sign list 213 Maintenance is performed for preventing unnecessary enlargement of the list, listing a plurality of same destination addresses, and so on. The content of the maintenance is deleting the destination network addresses of the sign signals where the countersign signals were not returned within the timeout time from the sign list 23 (S1602). This is repeated at regular time intervals by a timer (S1604).

The result of the reachability check is judged false at the point after the timeout time. Thus, after the result of the reachability check was judged (that is to say, after timeout), the destination network address when sending a sign signal need not be stored.

The record format will be "network address: time".

This case is also a simple adjustment, which is not the essence of the invention.

Embodiment 2 is a case where the receiving section 130 and the sending section 230 coexist in a same communication node (that is to say, one host is both the destination and the originator).

Embodiment 3 is an example application of embodiment 2 in case where the second communication node is in NAT and others. The destination and the originator seem like one communication node from outside, though it is actually separated into 2 devices.

Here, please refer to Patent Document 1, embodiment 8. A customer network where the destination belongs is shown. The originator is added to the same customer network. That is to say, it is a case where the destination and the originator of the host are independent, though the individual host cannot be identified from the external network. In this case, the hosts must cooperate.

Figure 37:
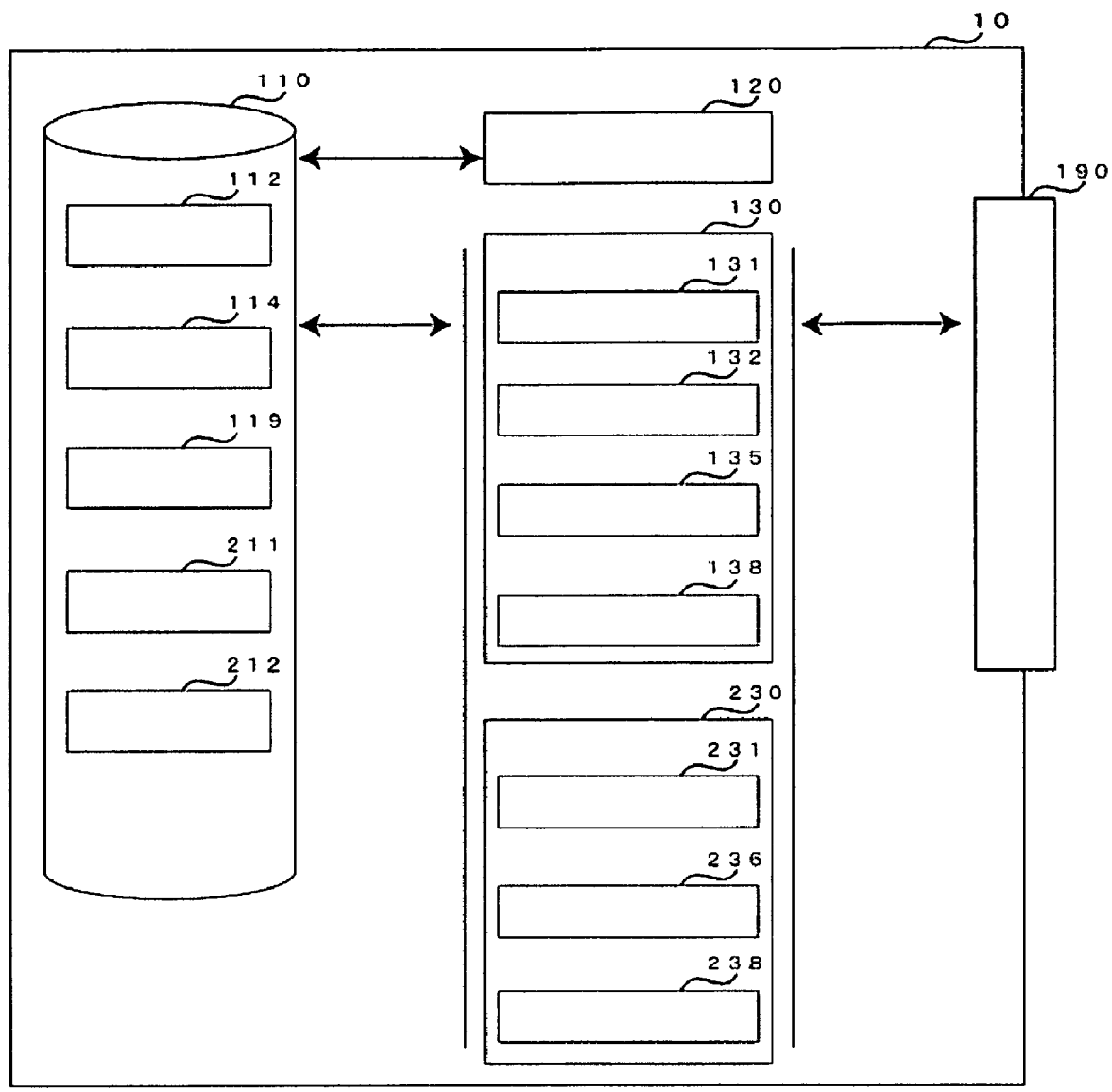
[FIG. 37] A block diagram in case the originator identifies the originator by sending a sign signal including its own static identifier.

As shown in Patent Document 1, Embodiment 8, FIG. 37, connection configuration 6, attention is required in case the host controlling the function in the customer network is independent.

1. First, the sending section 230 sends a sign signal.
2. The end's destination (the first communication node) not in the figures sends an additional sign signal to know the originator (sequence (2) in FIG. 29). Here, the boundary node of the customer network and the external network transfer said sign signal to the destination by forwarding or some technology. That is to say, the destination receives said sign signal, not the originator. That is to say, they must cooperate at this point.

Figure 35:
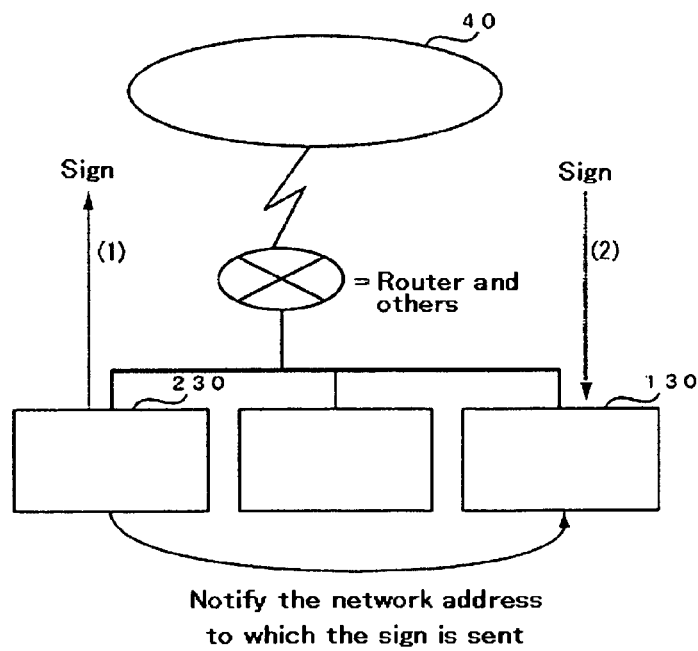
[FIG. 35] A diagram corresponding to FIG. 37 in Patent Document 1. (embodiment 3)

This is shown in FIG. 35.

FIG. 35 corresponds to FIG. 37 in Patent Document 1. FIG. 35 is equivalent to the second communication node.

Figure 36:
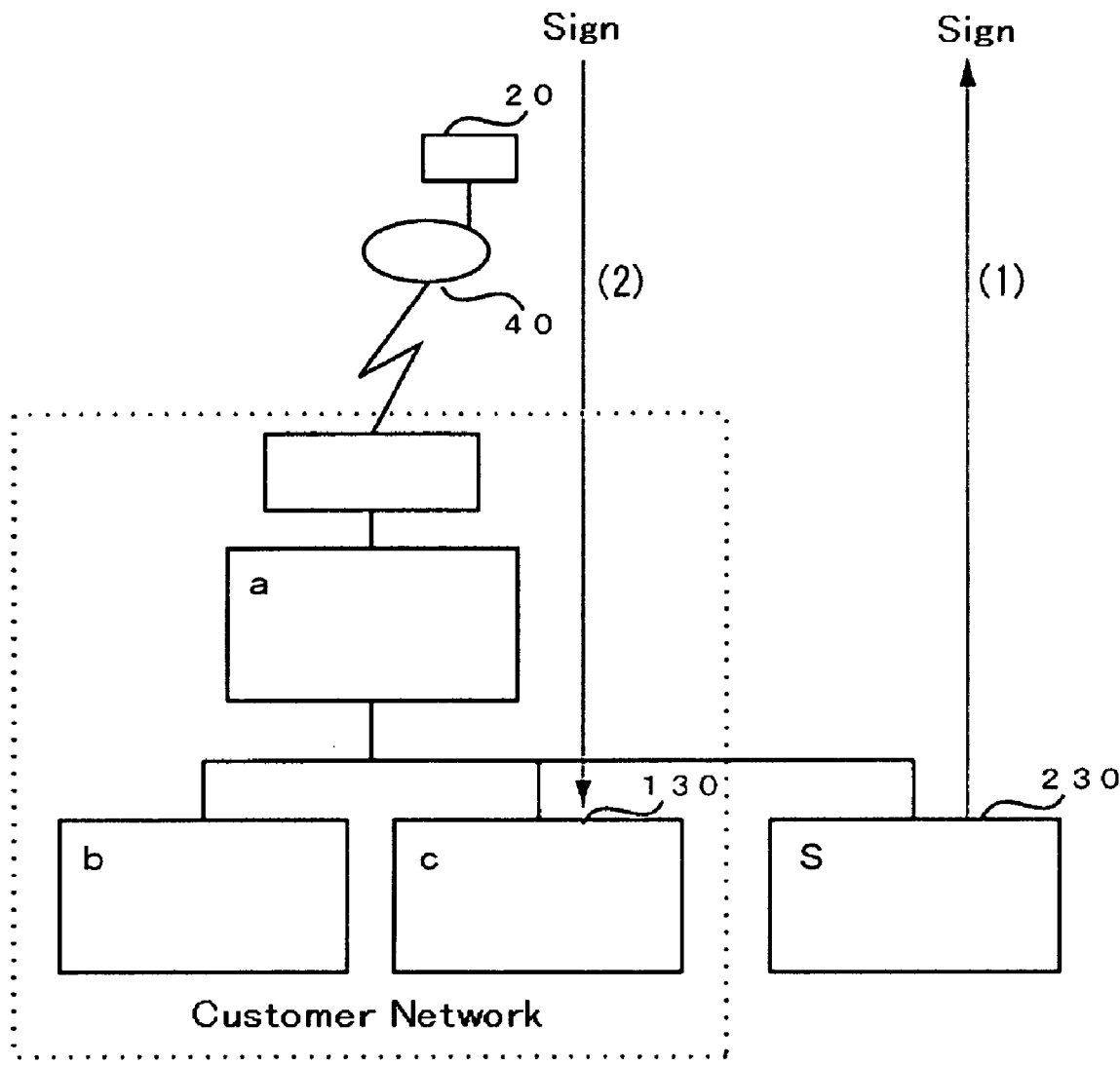
[FIG. 36] A diagram showing that an originator was added to the customer network on the destination side shown in FIG. 37 in Patent Document 1. (embodiment 3)

FIG. 36 is more similar to FIG. 37 in Patent Document 1. That is to say, FIG. 36 is a diagram showing not only that the customer network on the destination side shown in Patent Document 1 is merely on the destination side but also that the sending section 230 in case of operating as an originator was added.

In this case, the destination host and the originator host can be considered as same as embodiment 2, in case the sign list 213 is brought back as a shared file (even if it was independent as a device).

If not, after (1), the originator host requests the destination host to add the destination network address where the sign signal was sent to the list.

The sending section 230 may notify the destination network address where the sign signal was sent to the destination. The destination receives this and adds the network address sent from the sending section 230 to the list. The same process as embodiment 2 follows.

Embodiment 4 is a case where the static identifier of the originator is included in the sign signal.

The second solution is to include the static identifier of the originator in the sign signal.

Patent Document 1 proposed including minimum static identifier showing the destination to the sign signal, because this causes deception. However, inclusion of the static identifier showing the destination to the sign signal cannot be 100% excluded. So, the effect of the case with possibility of deception was considered and the deception was allowed.

However, the sign signals may include the static identifier showing the originator. In Patent Document 1, a sign signal was defined a signal for "merely promoting countersign signal".

Here, inclusion of the static identifier showing the originator in the sign signal is proposed.

The greatest merit obtained in this way is that only the parent session is necessary and the child session is unnecessary.

In this case, the static identifier showing the originator included in the sign signal will be merely self-assessing, so whether the static identifier of the originator included in the sign signal is correct or not cannot be confirmed only from this at the destination.

By the way, in case the static identifier showing the originator to the sign signal is included, this is substantially same with the countersign signal.

Therefore, in case of embodiment 4, if query was performed to the mapping announcement system after receiving a sign signal, the 4 elements shown in the Patent Document will be obtained.

The sequence will be as follows:
1. The static identifier showing the originator to the sign signal is included. The network address of the originator is obvious from the header when the sign signal is received. This enables knowing the real image of the pair comprising the static identifier and the dynamic network address.
2. Query to the mapping announcement system is performed by the static identifier included in the sign signal.
3. Reply from the mapping announcement system should be the network address at that time for the static identifier. The mapping of the pair comprising the static identifier and the dynamic network address can be known from sequences 2 and 3.

The destination can know all the 4 elements configuring the real image and the mapping (Patent Document 1) of the pair comprising the static identifier and the dynamic network address relating to the originator communication node by the above 3 processes.

As a result, if the network address of the originator of which the destination was known in 3 and the network address of the originator known in 1 is same, it can be known that the correct reachability is comprised for the static identifier showing the originator.

In case the originator included in the sign signal need not be correct and other cases, the query to the mapping notification system may be omitted and the countersign signal may be returned.

By the way, maintenance of the list must be described. In case the static identifier showing the originator is included in the sign signal, the list is unnecessary.

FIG. 37 is a block diagram of the first communication node in case the originator is identified by including the static identifier showing the originator in the sign signal.

The receiving section 130 provides the sign signal receiving section 131, the originator identifying section 132, the "reply that should be made" reading-out section 135 and the countersign signal sending section 138.

The originator identifying section 132 is connected to the sending section provided in the own node for extracting the static identifier of the originator carried by a sign signal or for knowing the correctness of the originator when receiving a sign signal. In addition, the result of the judgment by the judging section 238 called in the sending section 230 is stored in the identified originator storing section 114 for reference in the following processing.

The sending section 230 provides the network address acquiring section 231, the sign signal sending section 232, the countersign signal receiving section 235, the judging section 236 and the displaying section 238.

In case of operating only as the first communication node, the sending section 230 may only provide the network address acquiring section 231, the countersign signal receiving section 231, the judging section 236 and the displaying section 238. (This case is shown in FIG. 37.)

Furthermore, in case of using the first communication node where it is unnecessary to know the correctness of the originator communication node, the sending section 230 is unnecessary.

The sign signal sending section 232 includes the preprocessing for generating a sign signal including the static identifier showing the own node read out from the static identifier storing section 211 showing the own node prior to sending the sign signal.

The descriptions of the other sections are omitted to prevent overlapping.

Figure 38:
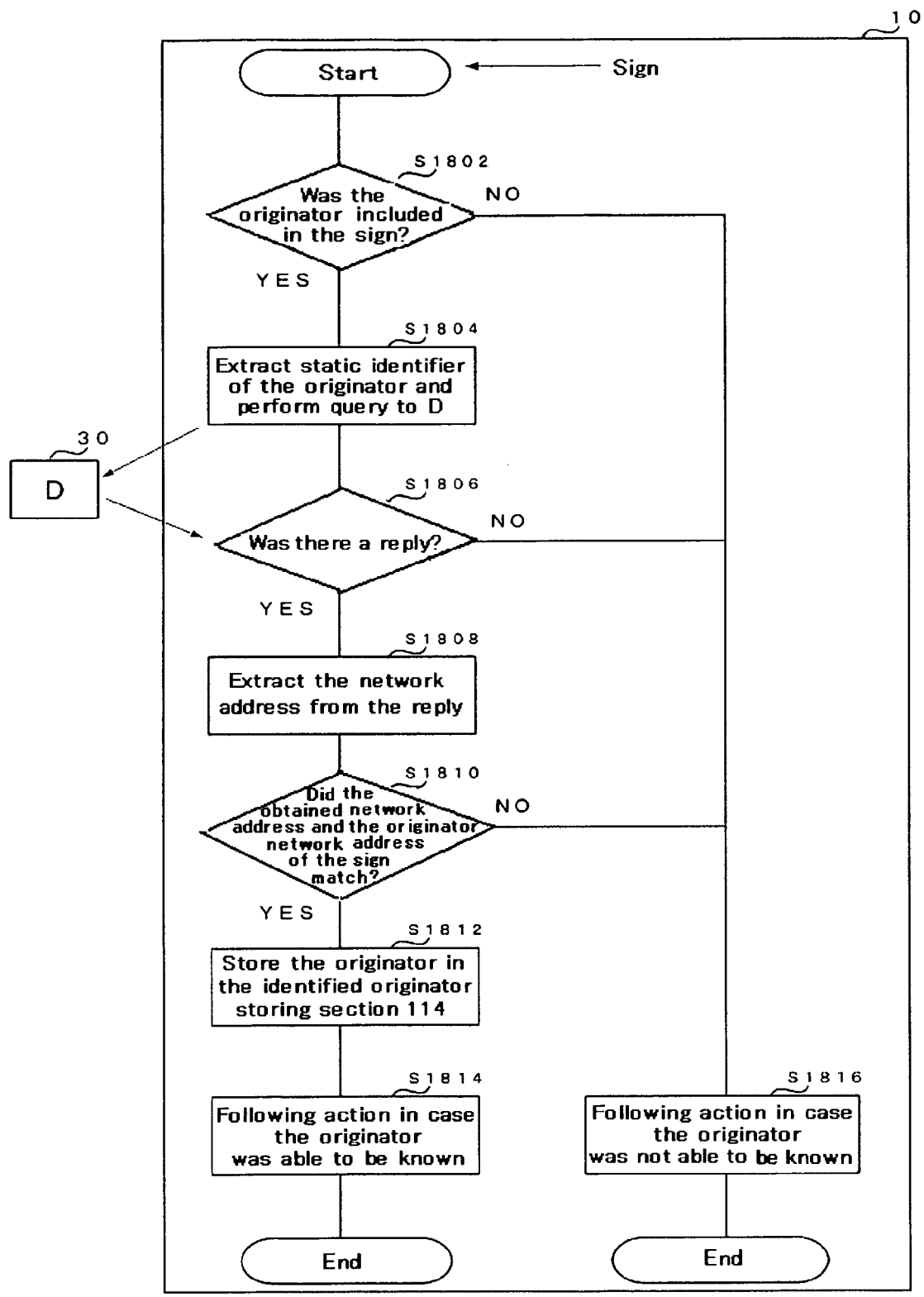
[FIG. 38] A flowchart showing the operation of the destination where the reachability check sets a sign signal with an originator as a trigger.

This is shown as a flowchart in FIG. 38.

FIG. 38 is the first communication node. The basis is the destination. FIG. 38 starts from receiving a sign signal.

S1802 branches according to a judgment whether the static identifier showing the originator is included in the sign signal. After the sign signal receiving section 131 once receives a sign signal, it may transmit the received sign signal to the work area 119 and judge whether the originator identifying section 132 includes the static identifier of the originator.

By the way, the case where a sign signal includes the static identifier showing the originator is same as suddenly sending a countersign signal.

The reply that should be made (used in the countersign signal) and the static identifier (included in the sign signal) may be different and the static identifier may be included in the sign signal sent from the originator to the destination.

From the theory shown in Patent Document 1, the "reply that should be made" and the static identifier of the originator in the sequence shown in the above 1 need not be same. Granted that the value showing the originator included in the sign signal was the "reply that should be made" which is not the static identifier showing the originator, the destination cannot know the static identifier showing the originator used in performing query to the mapping announcement system, unless said reply that should be made is reversible to the static identifier. In addition, the static identifier is originally not a secret. Thus, even if the "reply that should be made" is replaced or deformed, merely the static identifier of the originator may be included in the sign signal in the sequence shown in the above 1.

In S1804, the originator identifying section 132 extracts the static identifier showing the originator from the received sign signal and the network address acquiring section 231 performs query to the mapping announcement system by said static identifier.

S1806 is the section where the network address acquiring section 231 receives the reply. Here, "whether there was a reply" is judged, though the case where there is no reply here is a case where failure is occurring in the mapping announcement system itself, which may originally be ignored. Actually, in Patent Document 1, "whether there was a reply" here is not asked. (Refer to Patent Document 1, FIG. 23, S204)

S1808 extracts the network address of the originator from the reply which the address acquiring section 231 received in S1806.

In S1810, the judging section 236 judges "whether the above obtained network address and the originator network address of the sign matched". This is described in another way. Here, it is judged whether the followings are matched. It judges the matching of the mapping of the pair comprising the static identifier and the dynamic network address in the mapping announcement system and the real image of the pair comprising the static identifier and the dynamic network address in the originator.

Of course, when they match, the result of the reachability check is true. That is to say, this is the case where "the originator was able to be known". In this case, the static identifier of the identified originator is stored in the identified originator storing section 114 for the later reference in S1812 and goes on to S1814.

If they don't match, the result is false. That is to say, this is the case where "the originator was not able to be known". In this case, it goes on to S1816. S1816 is the normal case where the originator was actually not known. Here, S1814 is true and S1816 is false, and, the base concept judging true/false is the reachability check. However, here, it cannot be forgotten that the concept of the reachability check is actually the reachability by the static identifier to the originator by the reverse.

Thus, S1814 is the case where the originator was able to be known and S1816 is the case where the originator was not able to be known.

This enables the following action to selectively respond based on the originator identification. The most general following action is the case of a mere result display. However, this is the case of the first communication node, so returning the countersign signal is a general following action.

As an example, a selective response such as returning a countersign signal only in case the originator was identified (S1814) and not returning a countersign signal in case the originator was not identified (S1816) and others are enabled. Furthermore, the originator is identified in case of S1814, so it is able to make different response in detail according to the originator.

The example of the following action will hereinafter be described in detail. Here, It is important to be able to take different actions in the cases of S1814 and S1816.

Embodiment 5 is the integrated model for ensuring the originator identification.

At last, the first communication node which is able to know the static identifier showing the originator even if it is the sign signal including the static identifier showing the originator or the sign signal not including the static identifier showing the originator is shown (of course, this is also applied to the second communication node).

Most briefly describing, this is an integrated model executing embodiment 2 in case of receiving a sign signal including the static identifier showing the originator in embodiment 4.

Figure 39:
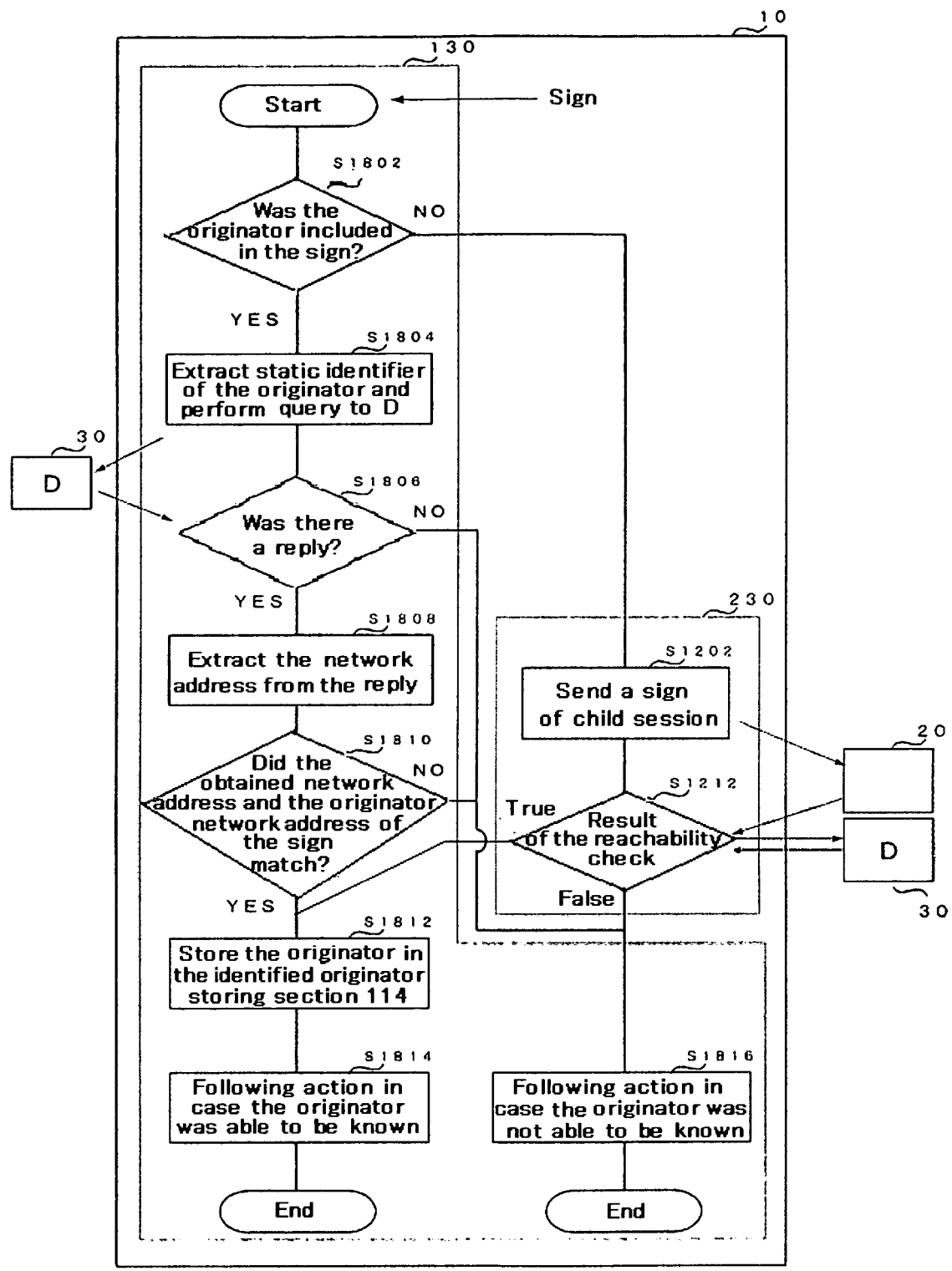
[FIG. 39] A fusion-type flowchart for ensuring the originator identification which is the first communication node. (embodiment 5)

This is shown in FIG. 39.

The process taken in embodiment 2 (simplified in the figure) is cited for the originator in the figures (S1202 to S1212). In case the static identifier showing the originator is not included in the sign signal in S1802, it may be executed. However, this is optional. That is to say, the left part of the figure is the destination part, which shows that the part taken in embodiment 2 can be omitted. This shows that the child session can be omitted. In the figure, in case S1806 or S1810 judges NO, it branches to S1816 "the case where the originator was not able to be known", though it may be connected to the sending section 230 and the sign signal of the child session may be sent.

In case of the sign signal with the originator, a sign signal need not be sent to the originator (the second communication node). However, assuming the case where the originator cannot include the static identifier showing the originator in the sign signal, the static identifier showing the originator may be intentionally known executing the sending section 230 on the right side of the figure and using the child session.

(New Theory)

FIG. 40 shows the communication sequence compared with Patent Document 1. It shows which element of the real image or the mapping of the pair comprising the static identifier (=B) and the dynamic network address can be known by the communication sequence. If the real image and the mapping of the pair comprising the static identifier and the dynamic network address can be known, please refer to Patent Document 1 for the theory that it can be known as the communication end with the correct reachability.

In FIG. 40, the communication node surrounded by a circle is the communication node for checking reachability. (A) on the upper side shows the technology in Patent Document 1. In Patent Document 1, the originator judges the reachability of the destination. (As an aside, the correctness of the reachability in this case is discomfort. It should be the correctness of the static identifier showing the originator under normal circumstances, though it is left as reachability here for fitting with Patent Document 1.)

From Patent Document 1, the element obtained by communication with the mapping announcement system is equivalent to the mapping and the element obtained by communication with the communication node which is not the mapping announcement system is the real image of the end whose reachability is desired to be checked.

The order of B and A in the communication with the mapping announcement system will be as follows regardless of the cases of (A) and (B). This order is due to "unidirectional in association with the static identifier and the dynamic network address" described in the Patent Document 1. The exceptions given in "the case where functions are combined" in embodiment 8 in Patent Document 1 is not included.

Eventually, the real image and the mapping of the pair comprising the static identifier and the dynamic network address can be known in case of (B). Thus, the correctness of the reachability (to the originator in this case) can be confirmed.

Thus, FIG. 40 (B) is a deformation of the communication model (A) shown in Patent Document 1.

(Loopback)

Newer communication model is made in this way.

In Patent Document 1, a communication model for confirming the correctness of the reachability to the destination is shown.

In the present invention, a communication model for confirming the correctness of the reachability to the originator is shown.

The theory could be confirmed by the correctness of the correspondence of the 4 elements of the real image and the mapping of the pair comprising the static identifier and the dynamic network address.

Here, please refer to FIG. 40 again.

The own node can naturally know about the real image of the pair comprising the static identifier and the dynamic identifier.

If so, the necessary 4 elements are obtained if the own node merely obtains the mapping of the pair comprising the static identifier and the dynamic network address from the mapping announcement system.

As a result, the reachability of the own node can be confirmed.

This is the loopback confirmation test method of the communication node which checks reachability.

This is described in FIG. 41.

FIG. 41 (A) is the loopback test performed in the originator communication node.

FIG. 41 (B) is the loopback test performed in the destination communication node. Loopback test can be executed in either way.

A and B surrounded by squares are elements which can be known without any communication with external. That is to say, the destination or the originator can obtain the above 4 elements by only performing query to the mapping announcement system for oneself (usually query is not performed for oneself). However, the reachablity/unreachability of the own communication node is turned out naturally after the matching of the real image and the mapping is judged.

Figure 42:
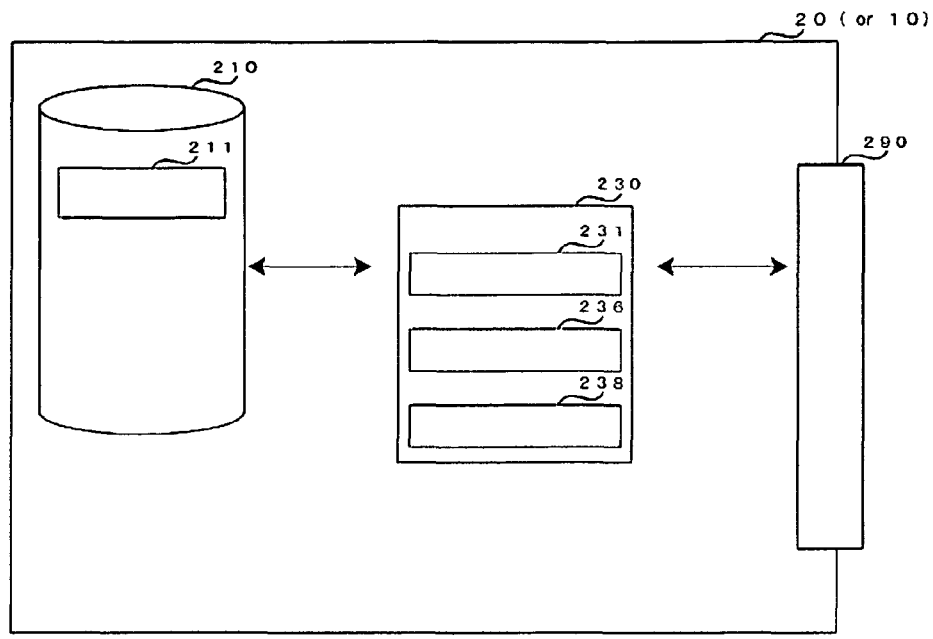
[FIG. 42] A block diagram showing minimum necessary configuration for the communication node to test the reachability with loopback.

FIG. 42 is a block diagram showing the minimum configuration for the communication node to test the reachability with loopback.

The communication node may only provide the storage device 210, sending section 230 and the communication I/F.

The sending section 230 provides the network address acquiring section 231, the judging section 236 and the displaying section 238.

The first communication node may provide the receiving section 130 which is not necessary for loopback test.

The storage device 210 only needs the static identifier storage section 211 showing the own node.

The network address of the own node is regarded obvious. The network address of the network boundary referred to from external is also regarded obvious from the description of JPA 2004-197478 by the present applicant which is not published at the application of the present application.

By this, the real image of the pair comprising the static identifier and the dynamic address is known.

Thus, for testing the reachability with loopback, sign and countersign is unnecessary. (It may be used, though it is equal to reading out a value from the storage area of the own node.)

Embodiment 7

A method for the first communication node to selectively respond to the second communication node based on the originator identification is shown below.

Figure 43:
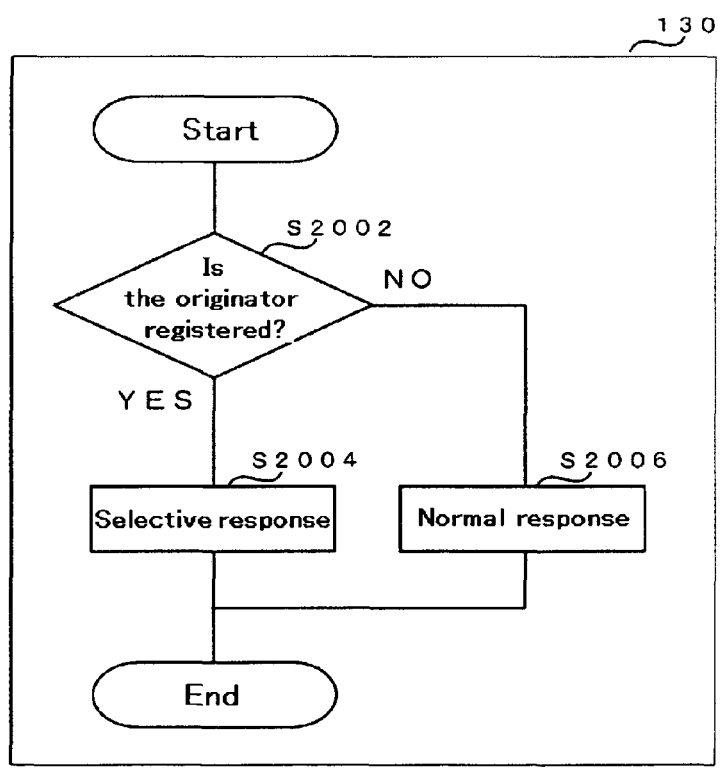
[FIG. 43] A schematic diagram of a selective response.

FIG. 43 shows a schematic diagram of the selective response. By the descriptions so far, the first communication node can already identify the second communication node based on the originator identification. Matching (S2002) may be performed using this. When matched, it is selectively responded (S2004). When not matched, it is normally responded (S2006).

Figure 44:
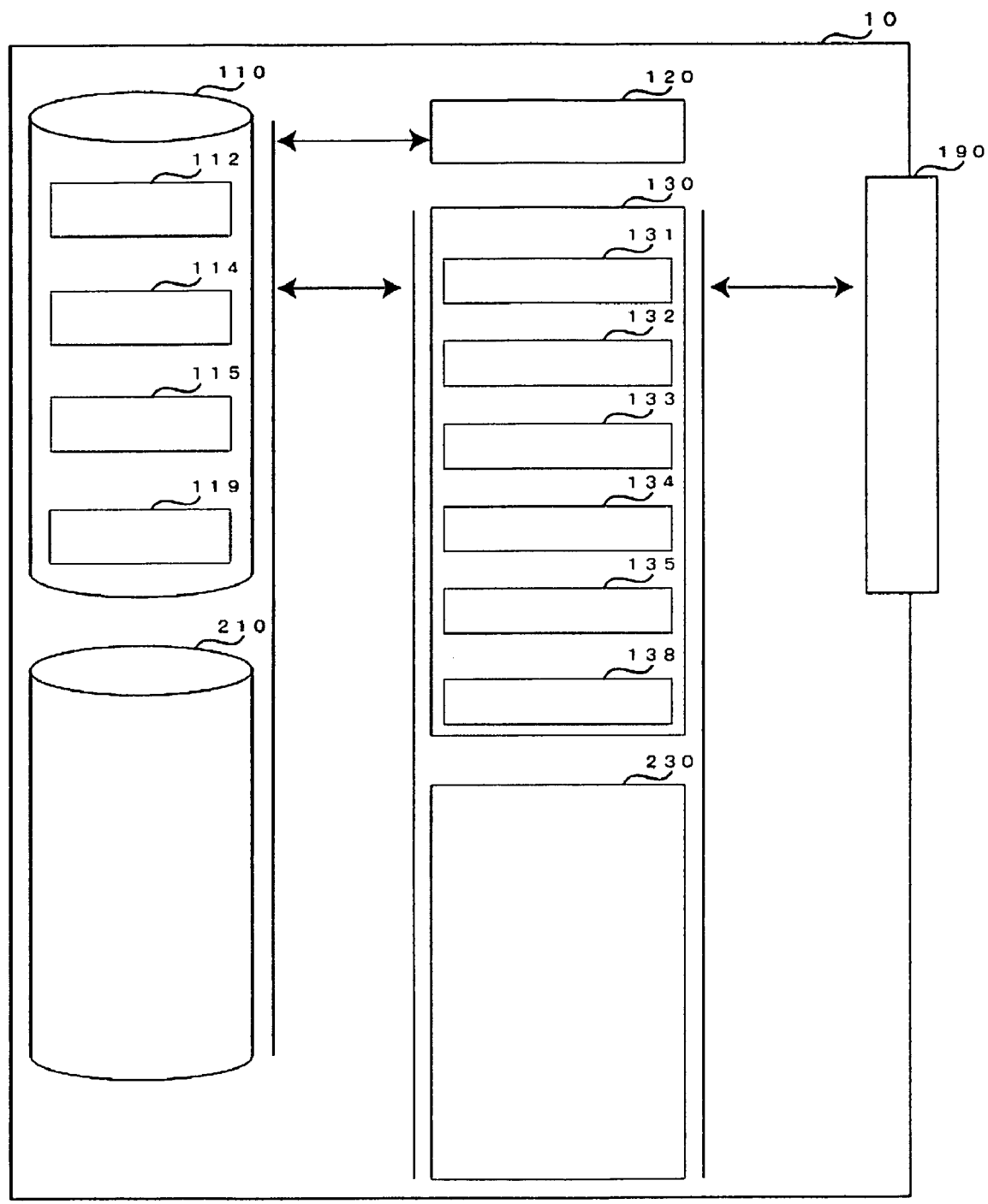
[FIG. 44] A block diagram of a selective response.

FIG. 44 is a block diagram showing a typical configuration of the first communication node. In FIG. 44, for example, the setting section 120 for providing a user I/F such as a console, the receiving section 130 for controlling when reachability is checked, the storage device 110 for storing various information and the physical communication I/F 190 for connecting to the network 40.

Here, registered originator information 115 stored in the storage information 110 is newly appeared.

The registered originator information 115 is information showing the communication ends previously registered by the user of the first communication node. A plurality of communication ends are usually registered to this information, which may be a list or DB. The format may only be a static identifier showing the communication end.

The other components are already described, so they are omitted here.

In FIG. 44, the storing section 210 and the sending section 230 are shown. These are used in the originator identification already described. The components depends on the method for identifying the originator. In selective response, the sending section is not used directly.

Figure 45:
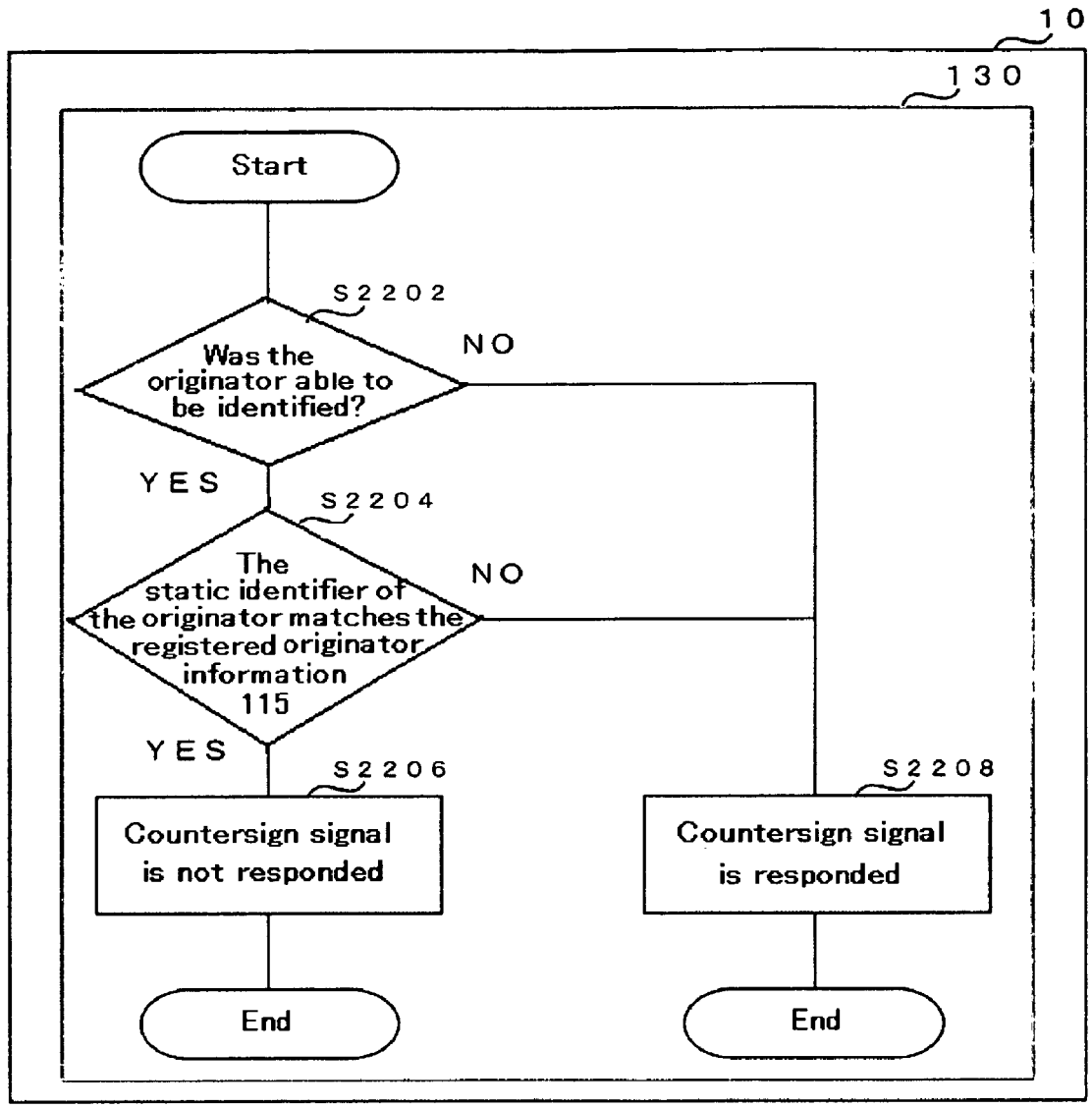
[FIG. 45] A flowchart of a selective response.

A flowchart for executing the present invention is shown in FIG. 45.

It starts from the end of the originator identification already described.

In S2202, whether the originator identification by the originator identifying section 132 is succeeded and finished is judged. In case it is true, matching is performed for the static identifier showing the second communication node turned out as a result of the above originator identification and the communication end previously registered in the registered originator information 114 by the matching processing section 133 in S2204.

If the result is true, a response different from the usual one can be made in S2206. Countersign can intentionally not be responded in particular.

In case it was false in either S2202 or S2204, a normal response is made in S2208. A normal countersign signal is sent in particular.

In this way, if the originator is identified, it can be judged whether it is the end previously registered and a special response can be made.

Embodiment 8

A method for the first communication node to make the second communication node to selectively detect the state information based on the originator identification is shown below.

In embodiment 7, the content of the selective response was whether to merely send the countersign signal or not. In embodiment 8, by adding a step relating to the additional information according to whether or not the second communication node is an already registered communication end, the state information different from the usual one is detected by the second communication node.

Figure 46:
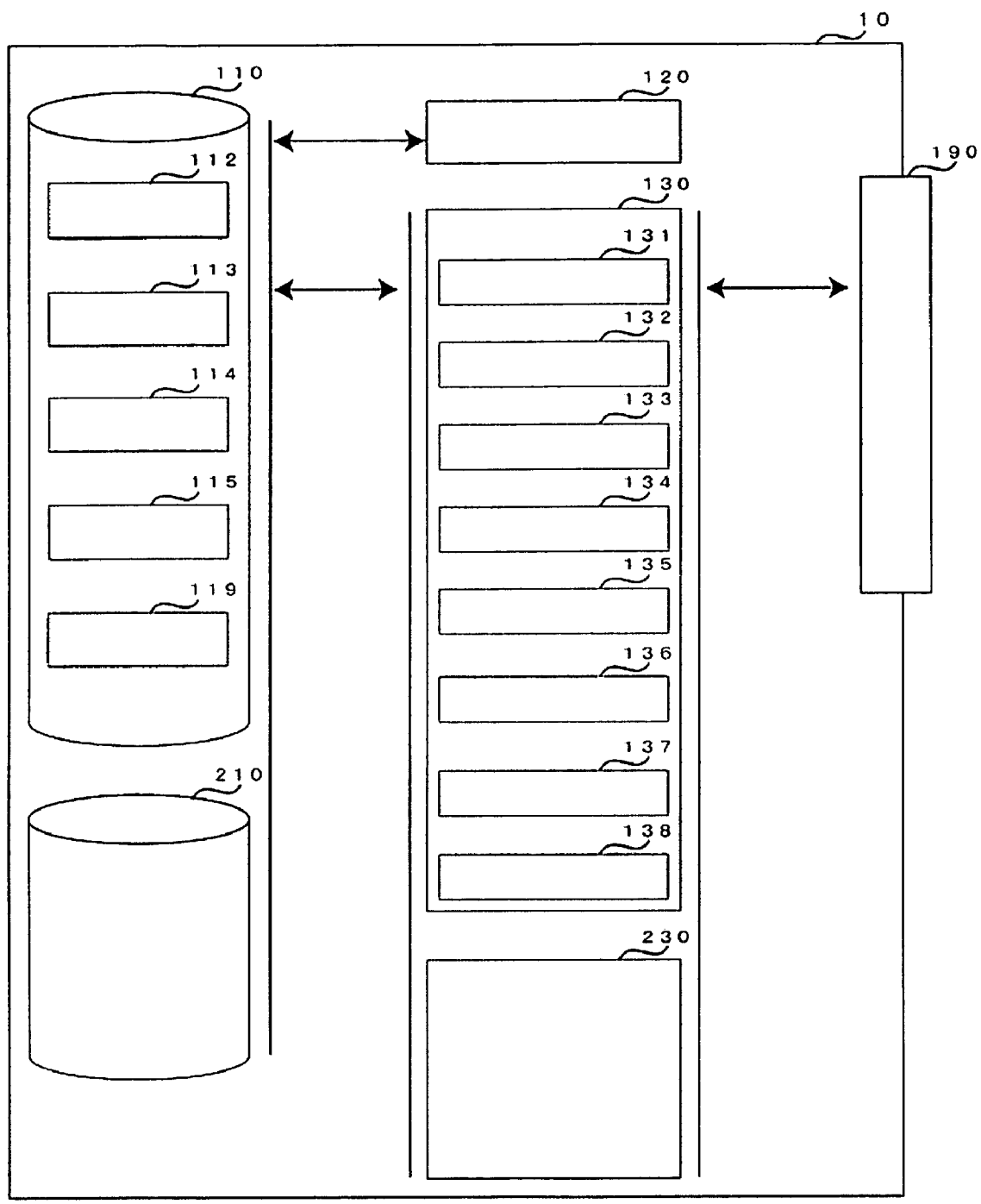
[FIG. 46] A block diagram in case the additional information is also selectively carried.

FIG. 46 is a block diagram showing a typical configuration of the communication node for executing the present invention.

The part relating to the additional information is added to FIG. 44. Please refer to the above descriptions for the additional information.

Figure 47:
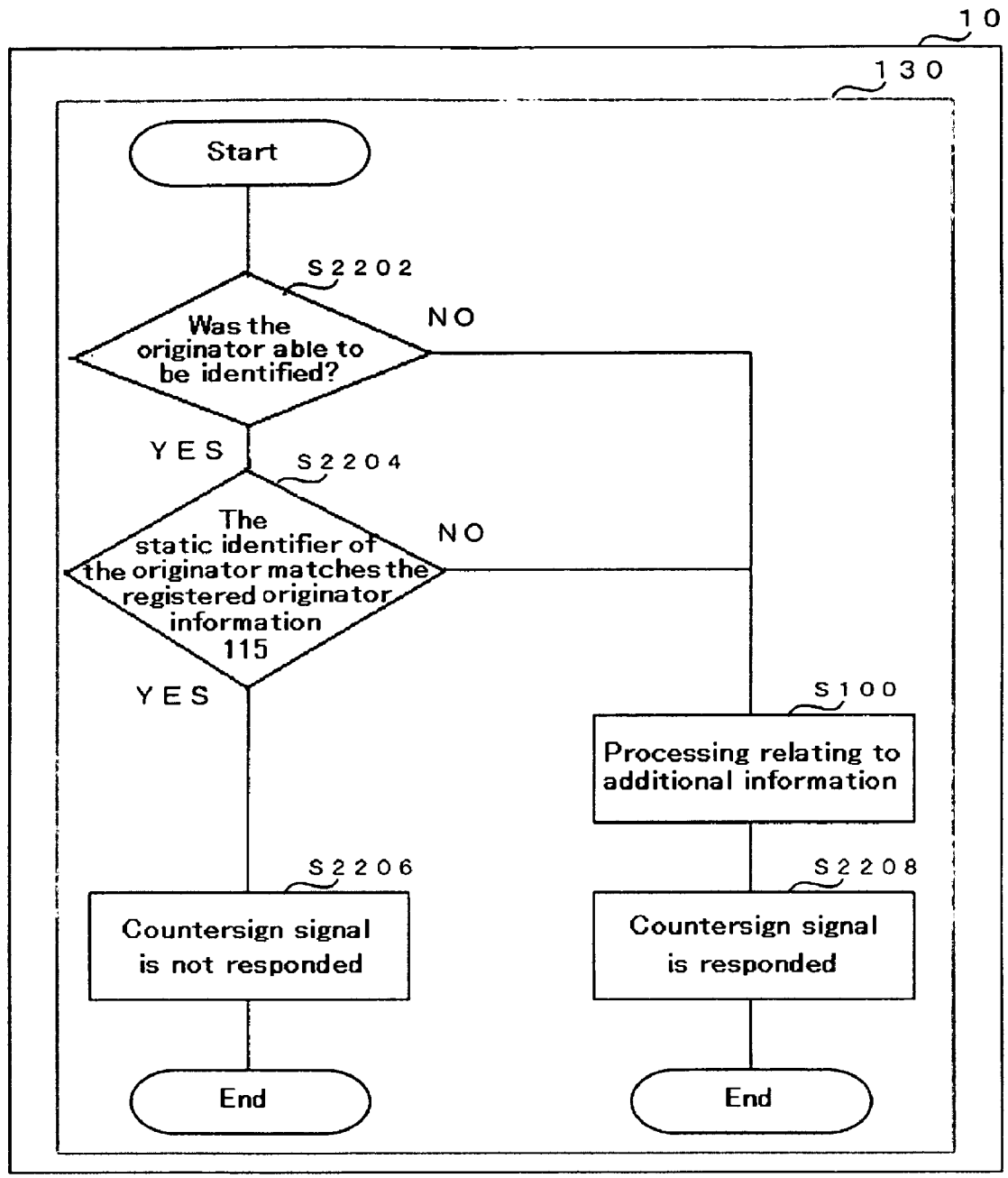
[FIG. 47] A flowchart in case the additional information is also selectively carried.

A flowchart for executing the present invention in shown in FIG. 47. The part relating to the additional information is added to embodiment 7. The additional information is described above, so only notes are mentioned here.

In S2204, in case the static identifier of the identified second communication node is registered to the registered originator information 115, the processing relating to the additional information may be executed before the countersign is sent. Here, S100 includes all the descriptions relating to the additional information already described.

Embodiment 9

How to selectively respond is described in embodiments 7 and 8. By the way, though it is selectively responded by originator identification, the content is merely the refusal of clarification. However, a normal response is made to an end who doesn't want to make unknown response. From this, a technology for responding only to acquaintances is anticipated. This is realized hereinafter.

Figure 48:
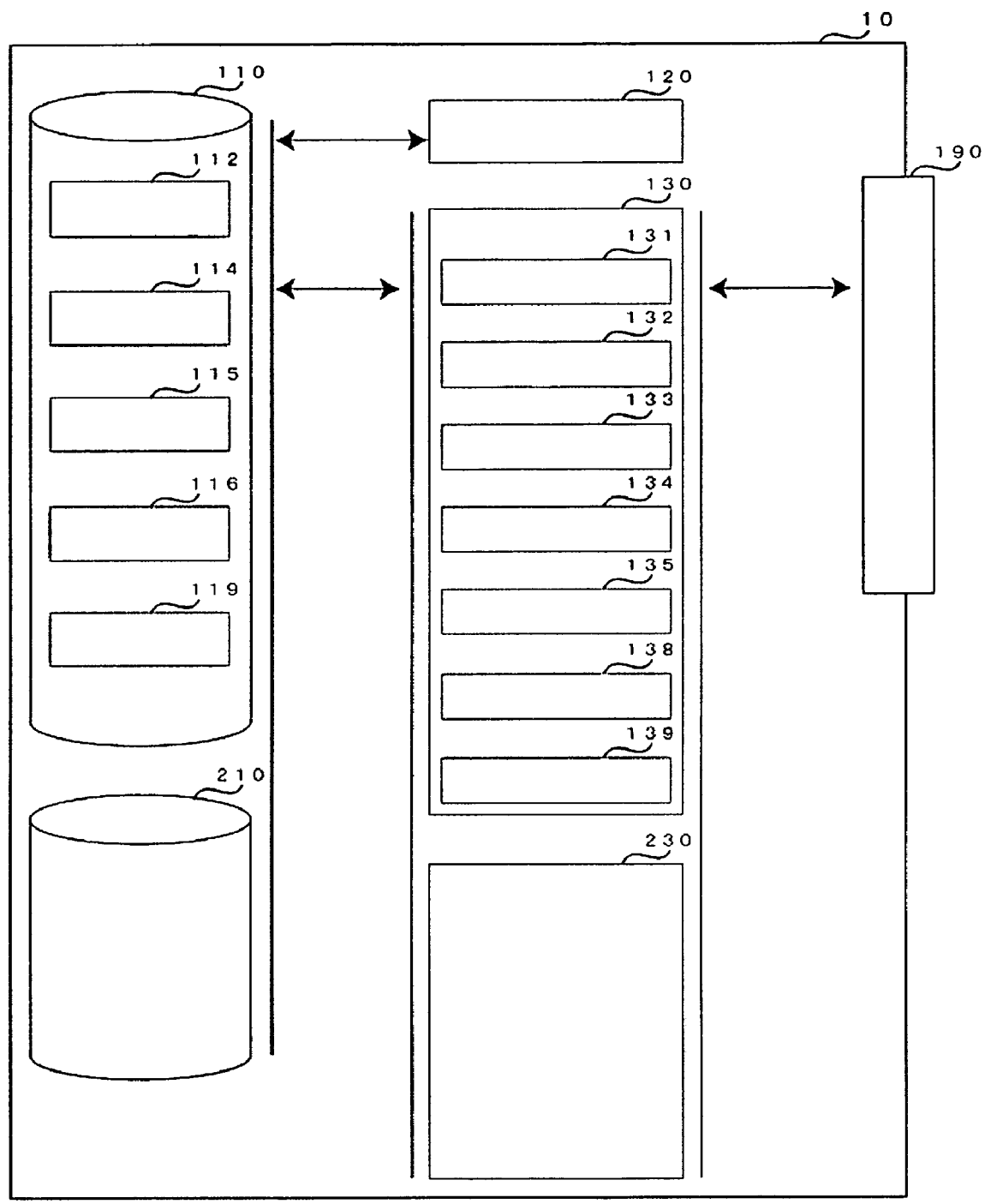
[FIG. 48] A block diagram in case of responding only to acquaintances.

FIG. 48A is a block diagram showing a typical configuration of the first communication node. FIG. 48 shows, for example, the setting section 120 for providing a user I/F of a console and others, the receiving section 130 for controlling when reachability is checked, a storage device 110 for storing various information and a physical communication I/F 190 for connecting to the network 40.

Here, a standard operation reversal flag 116 stored in the storage device 110 and a circuit reversing section 139 included in the setting section 130 are newly appeared.

The circuit reversing section 139 checks whether the standard operation reversal flag 116 is ON/OFF and reverses the standard operation when it is ON.

The other components are omitted because they are already described.

Figure 49:
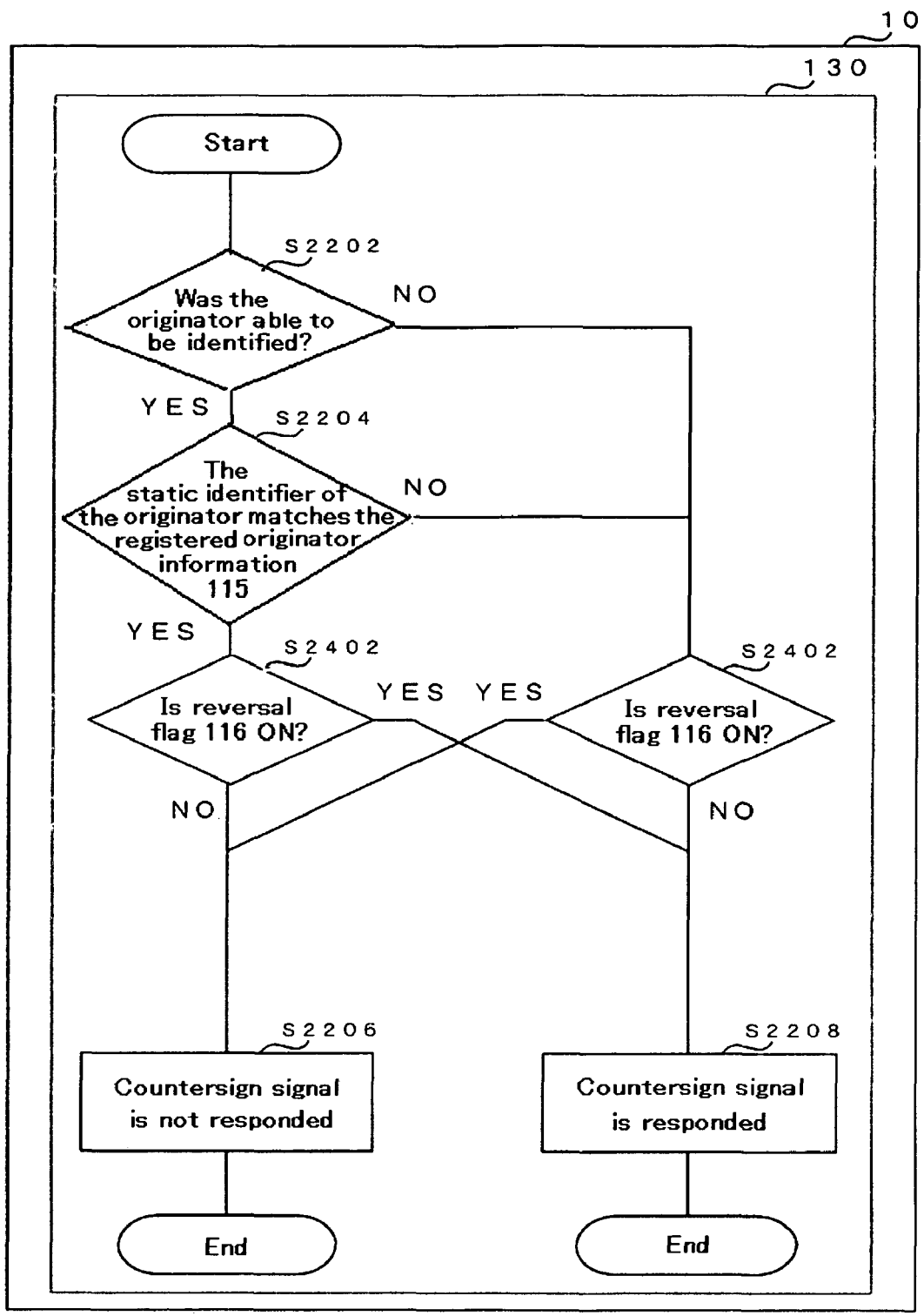
[FIG. 49] A flowchart in case of responding only to acquaintances.

This operation is shown in FIG. 49 as a flowchart.

S2402 reverses the circuit by the circuit reversing section 139 if the standard operation reversal flag 116 is ON. In this way, the countersign signal can be sent only in case the static identifier showing the originator in S2204 is already registered in the registered originator information 115 (that is to say, only to acquaintances).

The standard operation can be fixedly reversed on success in S2202 and on match in S2204. However, in this case, it should be noted that the degree of freedom of the user of the first communication node will be reduced. In addition, ON/OFF of the standard operation reversal flag 116 is set by the user of the first communication node prior to the communication. The setting means in this case is omitted because it is merely a matter of whether to turn ON the flag or not. The example screen is also omitted.

Embodiment 10

The additional information can also be handled in embodiment 9.

Figure 50:
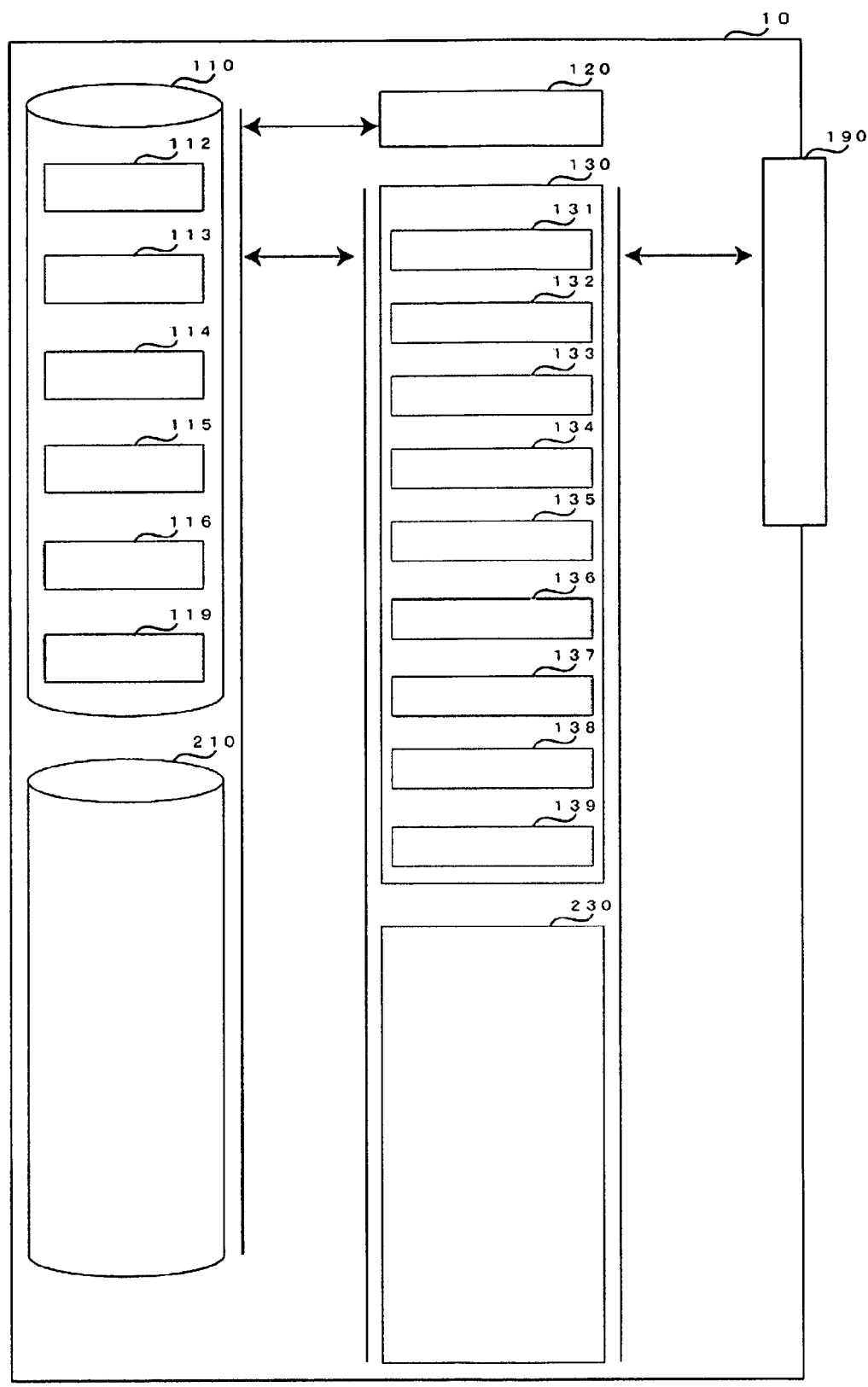
[FIG. 50] A block diagram in case of also carrying additional information only to acquaintances.
Figure 51:
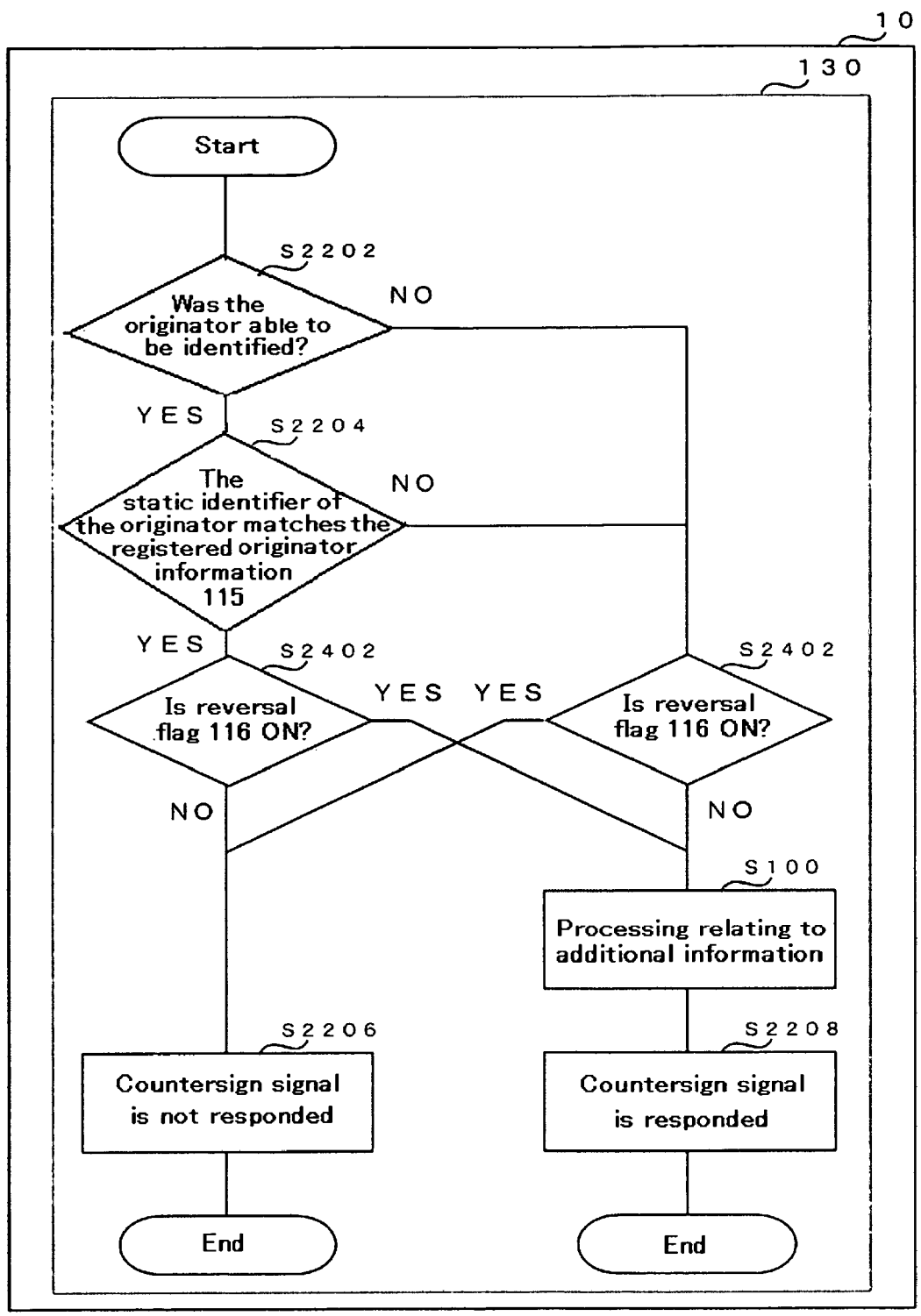
[FIG. 51] A flowchart in case of also carrying additional information only to acquaintances.

The block diagram in this case is shown in FIG. 50 and the flowchart is shown in FIG. 51.

The state information can be informed only to the acquaintances.

Embodiment 11

The matters so far is realized by the means using a broker. The present invention is characterized in performed among edge nodes. This is realized without going through a broker as shown below.

It is to make different responses depending on the originator not merely selectively responding.

If this is intended to be performed with a broker model, the combination number of the terminal will be exponential, so it is not practical for the brokers to manage these combinations by strapping them. Furthermore, different contents depending on the combination will be difficult in the future. It may not be impossible, though the inventor wouldn't do that.

The present invention comprises advantages that management is distributed and, as a result, that the concentration of load is prevented. In addition, various mechanisms can be built by the management of the user oneself. Not only the service previously prepared by the broker is used, but the user can also build the necessities by oneself. The present invention provides the basis.

Figure 52:
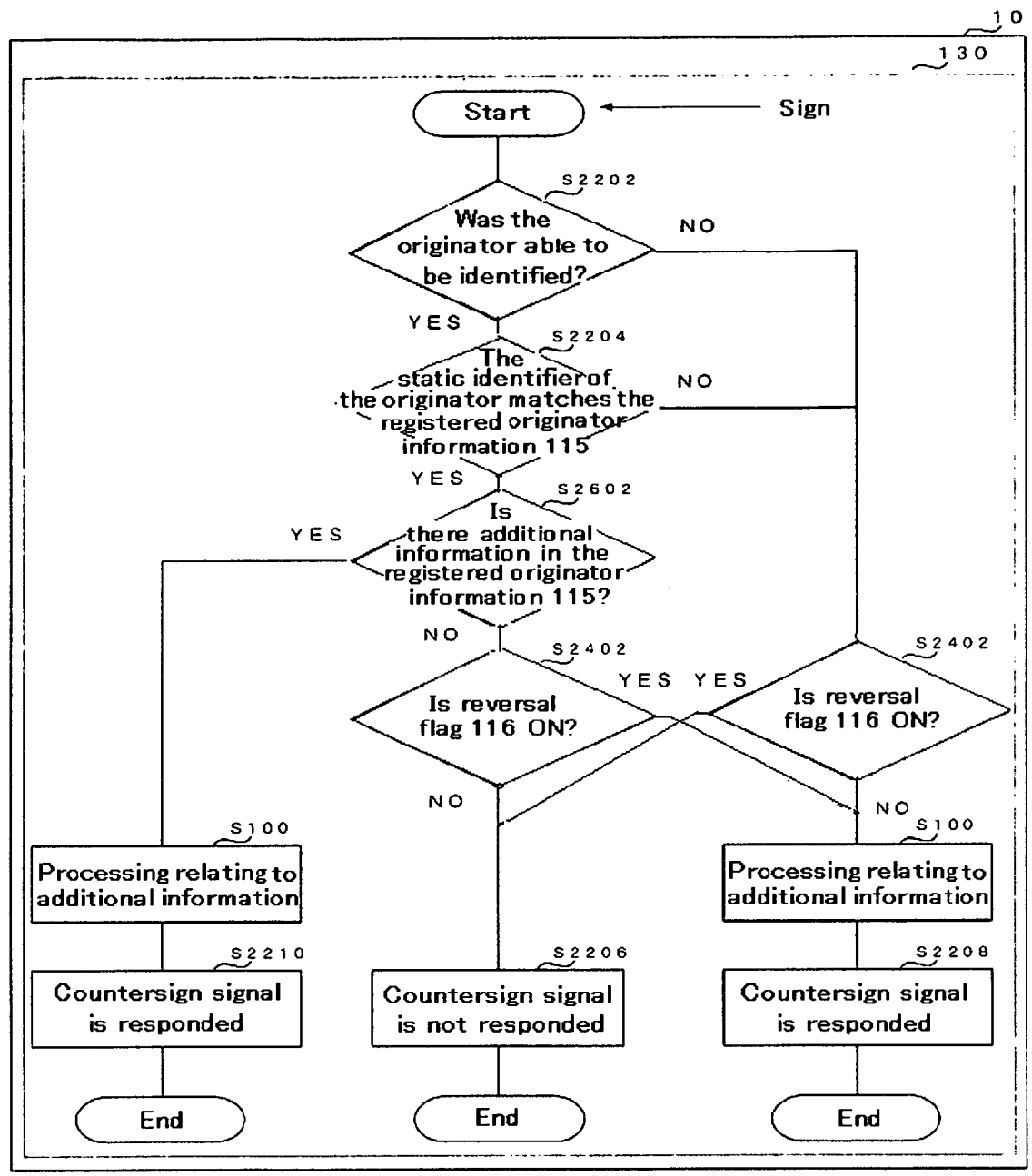
[FIG. 52] A flowchart in case of responding differently depending on each originator.

A flowchart is shown in FIG. 52.

In S2602, whether there is not only the static identifier merely showing the originator but also any description on the action or not is judged. Here, the object called action is actually merely the additional information.

If there is additional information for each originator, the action as written in the additional information may be taken. If it is a message, a countersign may be generated after it is merely read out. If it is a program call, a countersign may be generated based on the returned value (S2210). The block diagram may be the same as FIG. 50.

As already described, the additional information in the present invention is more flexible than the broker model. For example, it may handle not only fixed messages but also sensor outputs mounted on the first communication node. In addition, it is already disclosed that a plurality of additional information can be carried.

Please refer to FIG. 53. This is an example record format of the registered originator information 115. In the above descriptions, the record format of the registered originator information 115 may only be the static identifier showing the originator. However, as shown in FIG. 53 (B), the action can be described. As described in the additional information section, the additional information as information in the first communication node may be similarly handled whether it is a message or a program call. That is to say, it is an additional information setting pointer. In case different pointers are set for each communication end of the registered originator information 115, it means that different actions were taken for each communication end.

The flag showing "Replacement or Addition" shown in FIG. 53 (B) can be added in the action. Please refer to FIG. 54. FIG. 54 is an example telegram format for also carrying the additional information (please refer to FIG. 07).

The case of "Addition" in FIG. 53 (B) is the example in FIG. 54 (A).

The case of "Replacement" in FIG. 53 (B) is the example in FIG. 54 (B).

That is to say, in case of FIG. 54 (A), after the action for the matched originator (This is built in when generating countersigns as additional information for each originator.), the normal additional information is also read out and may be built in when generating a countersign signal. (Either one may be performed first.)

The description "in case a plurality of additional information are included as shown in FIG. 07 (B), conversion shown in FIG. 11 may be repeated necessary times placing its limit at the number of the additional information" in S608 on the additional information is a processing when displayed in the second communication node, which may be performed when a countersign is generated in the first communication node. Here, performing 2 times, the additional information for each originator and the standard additional information, is shown.

In this way, different responses can be made for each originator.

(Example Result Display Screen of the Second Communication Node)

FIG. 55 shows an example screen displaying the result of the reachability check of the first communication node by the second communication node by FIG. 52, S208. (Example setting screen in the first communication node)

Figure 56:
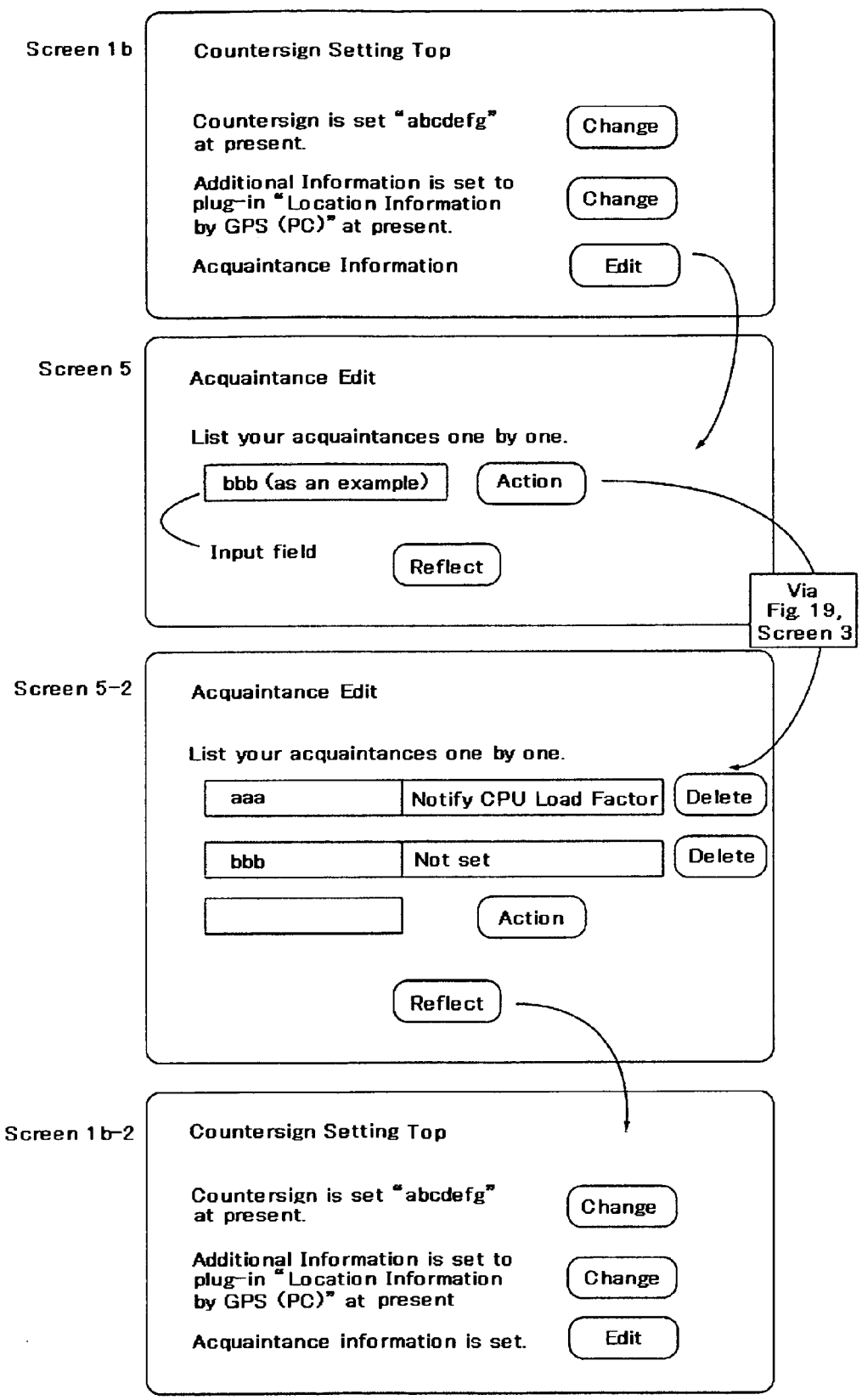
[FIG. 56] An example setting screen of the first communication node.

FIG. 56 shows an example setting screen in the first communication node. Screen 1b is an example of the top screen of countersign setting. Here, "Acquaintance Information" is added in Screen 1 in FIG. 18. The static identifier showing the originator is inputted in the input field and "Reflect" button or "Action" button is pushed.

By pushing the "Action" button, the state information which is desired to be detected for the originator (that is to say, the additional information) can be set. The setting screen of this additional information may be FIG. 19, Screen 3 already described. By pushing "Set" button in FIG. 19, Screen 3, it returns to Screen 5-2.

Not selecting "Action" but pushing "Reflect" button in Screen 5 (the static identifier of the originator is inputted in the input field), the originator without the additional information can be registered. In this case, it is operated like embodiment 10. That is to say, it goes on to S2208 or S2208, not S2210, in FIG. 52.

By pushing "Reflect" button in Screen 5-2, it returns to the countersign setting top screen.

In Screen 1b-2, it was changed to clarification for description of the message "Acquaintance information is set".

INDUSTRIAL APPLICABILITY

The state information of the communication end can be detected more flexibly than using a broker.

The invention claimed is:

1. A network system comprising:
a processor operatively coupled with a memory and network interface, wherein said network is characterized by host reachability being obtained by associating a static identifier with a network address;
a first communication node operatively coupled with said processor, said first communication node configured for sending a countersign signal configured for carrying state information of a reachability checked communication node or a message comprising strings added to a reply that should be made as additional information;
a map information system identifying a contractor by logging in, holding a movement history of a first communication node for the contractor and providing location information of the first communication node by the movement history or/and a present location of the first communication node; and
a second communication node configured for extracting the residual part deducted from a portion of said countersign signal obtained from a first communication node, wherein the second communication node converts additional information to a form convenient for a user of the second communication node, wherein the second communication node repetitively detects state information of a first communication node, wherein the second communication nodes maintains the movement history of the first communication node, and according to said movement history, displays the result of the movement history and a present location of the first communication node.

2. The network system of claim 1, wherein said communication node performs a reachability check characterized in extracting a portion of the countersign signal.

3. The network system of claim 1, further comprising a means for displaying the extracted information as additional information.

4. A method of performing a reachability check, wherein a reachability checked communication node knows correctness of reachability as an originator of a reachability check communication node by performing the steps of
 (1) determining if a reachability check communication node knows a static identifier and a dynamic network address of a reachability check communication node by a reachability check communication node notifying a static identifier showing a reachability check communication node to a reachability checked communication node;
 (2) performing, by a reachability checked communication node, a name query for requesting a mapping announcement system with a key of a static identifier of a reachability check communication node; and
 (3) name solving, wherein a mapping announcement system responds to said name query with a dynamic network address of a reachability check communication node in a communication model characterized in judging true/false of reachability of a reachability checked communication node by comparing a mapping of a pair comprising a static identifier and a dynamic network address showing a reachability checked communication node in a mapping announcement system with a real image of a pair comprising a static identifier and a dynamic network address in a reachability checked communication in a store-and-forward network, wherein host reachability is obtained by associating a static identifier with a dynamic network address.

5. The method of claim 4, wherein the correctness of reachability by a static identifier of a node is determined by:
 (1) determining a static identifier and a dynamic network address of an own node;
 (2) performing a name query for requesting a mapping announcement system with a key of a static identifier of an own node; and
 (3) name-solving where a mapping announcement system responds this query a dynamic network address relating to said static identifier to which a query was informed.

6. The method of claim 4, further comprising a loopback test method performed in a communication node comprising a static identifier and a dynamic network address.

* * * * *